United States Patent
Nakagawa

(10) Patent No.: US 9,348,485 B2
(45) Date of Patent: May 24, 2016

(54) IMAGE PROCESSING APPARATUS AND METHOD, AND COMPUTER PROGRAM PRODUCT

(75) Inventor: Maiko Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 183 days.

(21) Appl. No.: 13/984,095

(22) PCT Filed: Mar. 2, 2012

(86) PCT No.: PCT/JP2012/001429
§ 371 (c)(1),
(2), (4) Date: Aug. 7, 2013

(87) PCT Pub. No.: WO2012/120849
PCT Pub. Date: Sep. 13, 2012

(65) Prior Publication Data
US 2013/0318480 A1 Nov. 28, 2013

(30) Foreign Application Priority Data
Mar. 9, 2011 (JP) ................................. 2011-052086

(51) Int. Cl.
*G06F 3/048* (2013.01)
*G06F 3/0481* (2013.01)
*H04N 13/00* (2006.01)
*H04N 101/00* (2006.01)
(Continued)

(52) U.S. Cl.
CPC ........ *G06F 3/04815* (2013.01); *G06F 3/04817* (2013.01); *H04N 13/0022* (2013.01); *H04N 13/0497* (2013.01); *G06F 3/0481* (2013.01); *H04N 5/23216* (2013.01); *H04N 13/0409* (2013.01); *H04N 13/0452* (2013.01); *H04N 2101/00* (2013.01)

(58) Field of Classification Search
CPC ...................................................... G06F 3/0481
USPC ........................................................... 715/849
See application file for complete search history.

(56) References Cited

U.S. PATENT DOCUMENTS 6,281,877 B1 * 8/2001 Fisher .................. G06F 3/04815
345/419
6,574,361 B1 * 6/2003 Kawakami ............ G06T 7/0075
382/154

(Continued)

FOREIGN PATENT DOCUMENTS

| JP | 2004-280496 A | 10/2004 |
| JP | 2005-316790 A | 11/2005 |
| JP | 2006-236143 A | 9/2006 |

OTHER PUBLICATIONS

U.S. Appl. No. 13/982,589, filed Jul. 30, 2013, Nakagawa.
(Continued)

*Primary Examiner* — William Titcomb
(74) *Attorney, Agent, or Firm* — Hazuki International, LLC

(57) ABSTRACT

A control unit, method and computer program product cooperate to provide a controllable depth of display of at least a part of a graphical user interface. Moreover, the control unit includes a control circuit that controls a depth display of an icon, which may be a user-selectable icon, as part of the graphical user interface. The control circuit increases the depth of display of the icon when an object is detected as approaching the display. In this way, a user is provided with visual feedback when the user is interacting with the graphical user interface.

20 Claims, 20 Drawing Sheets

(51) Int. Cl.
*H04N 13/04* (2006.01)
*H04N 5/232* (2006.01)

(56) References Cited

U.S. PATENT DOCUMENTS

| | | | | |
|---|---|---|---|---|
| 6,880,132 B2* | 4/2005 | Uemura | | 715/848 |
| 7,848,542 B2* | 12/2010 | Hildreth | | 382/107 |
| 8,166,421 B2* | 4/2012 | Magal et al. | | 715/863 |
| 8,302,031 B1* | 10/2012 | Sang | | 715/848 |
| 8,493,382 B2* | 7/2013 | Ohta | G06T 15/30 | 345/419 |
| 8,521,411 B2* | 8/2013 | Grabowski | G01C 21/365 | 701/454 |
| 8,589,822 B2* | 11/2013 | Bell et al. | | 715/848 |
| 8,976,178 B2* | 3/2015 | Nakamura | G06F 3/04815 | 345/419 |
| 2008/0225007 A1* | 9/2008 | Nakadaira et al. | | 345/173 |
| 2008/0246759 A1* | 10/2008 | Summers | | 345/420 |
| 2009/0005961 A1* | 1/2009 | Grabowski | G01C 21/365 | 701/532 |
| 2009/0203440 A1* | 8/2009 | Ohba et al. | | 463/32 |
| 2009/0313584 A1* | 12/2009 | Kerr et al. | | 715/849 |
| 2010/0115471 A1* | 5/2010 | Louch et al. | | 715/849 |
| 2011/0041098 A1* | 2/2011 | Kajiya et al. | | 715/849 |
| 2011/0047512 A1* | 2/2011 | Onogi et al. | | 715/836 |
| 2011/0069019 A1* | 3/2011 | Carpendale et al. | | 345/173 |
| 2011/0093778 A1* | 4/2011 | Kim et al. | | 715/702 |
| 2011/0096033 A1* | 4/2011 | Ko | | 345/175 |
| 2011/0119629 A1* | 5/2011 | Huotari et al. | | 715/836 |
| 2011/0260965 A1* | 10/2011 | Kim et al. | | 345/156 |
| 2011/0281619 A1* | 11/2011 | Cho et al. | | 455/566 |
| 2012/0056989 A1* | 3/2012 | Izumi | H04N 13/0014 | 348/46 |
| 2012/0117514 A1* | 5/2012 | Kim et al. | | 715/849 |
| 2012/0192067 A1* | 7/2012 | DeLuca et al. | | 715/702 |
| 2013/0181982 A1* | 7/2013 | Tasaki | B60K 35/00 | 345/419 |
| 2015/0020031 A1* | 1/2015 | El Dokor et al. | | 715/849 |

OTHER PUBLICATIONS

International Search Report issued May 22, 2012 in PCT/JP2012/001429.

* cited by examiner

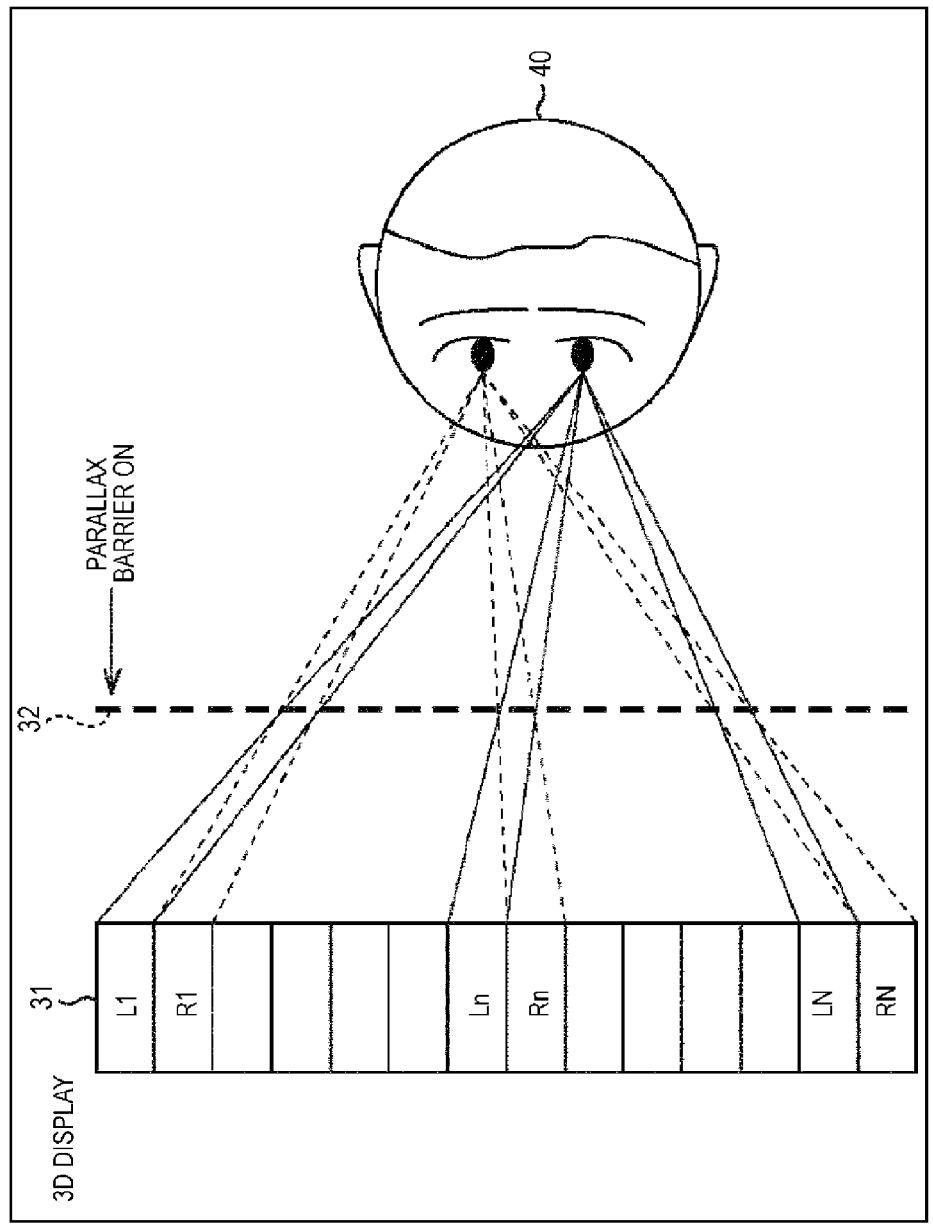

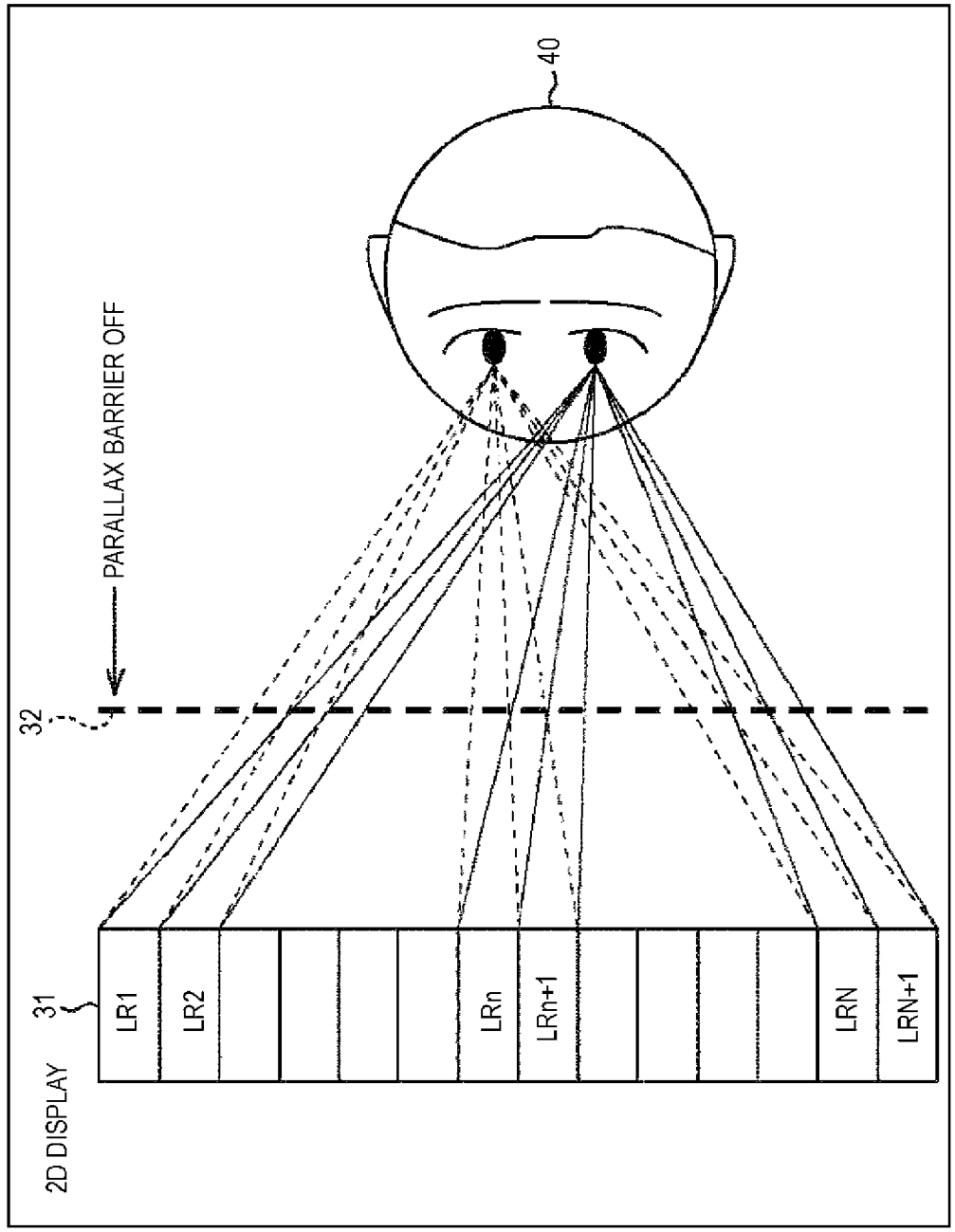

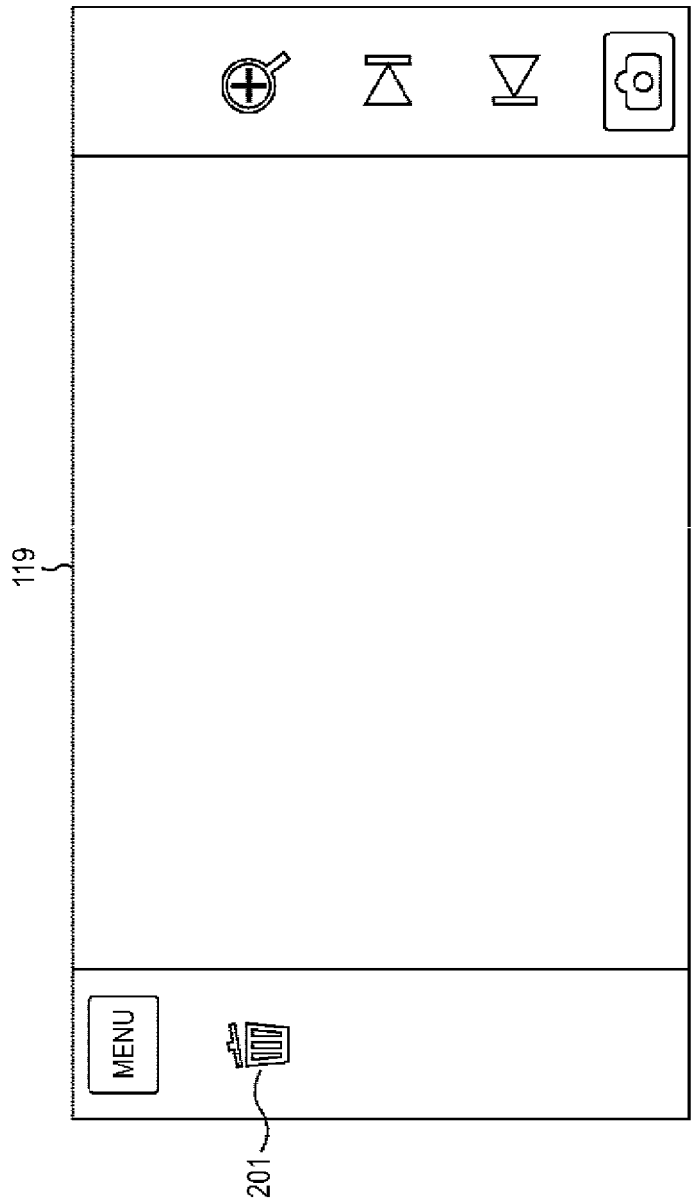

FIG.16A
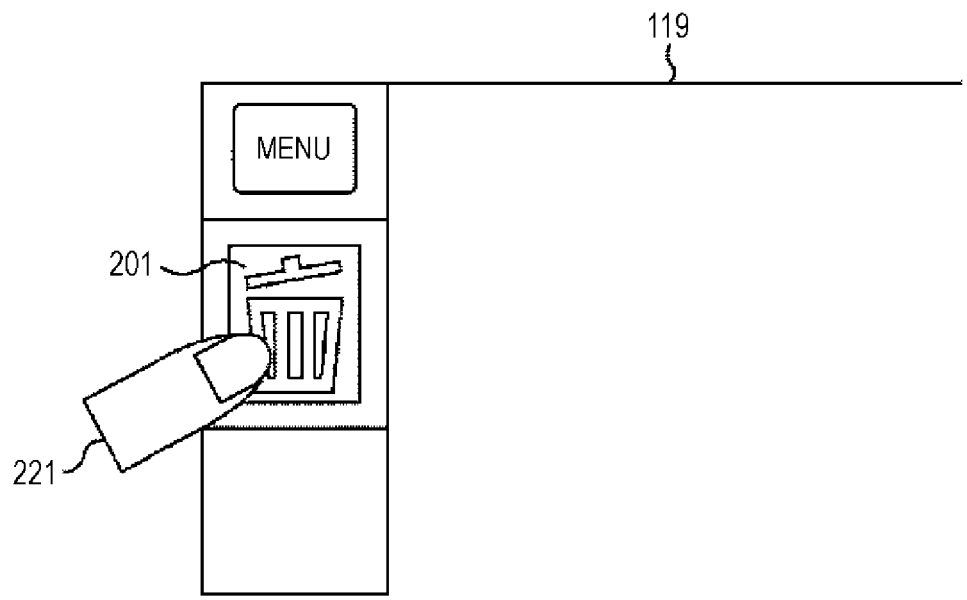
FIG.16B
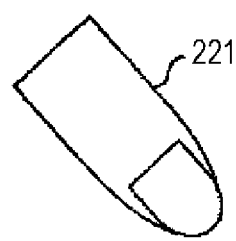
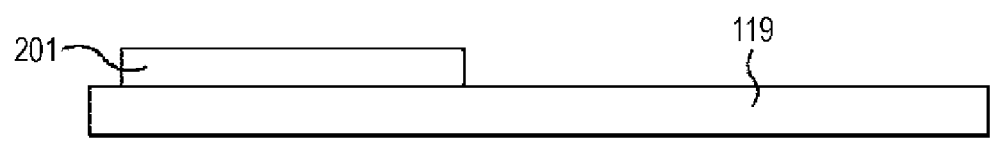

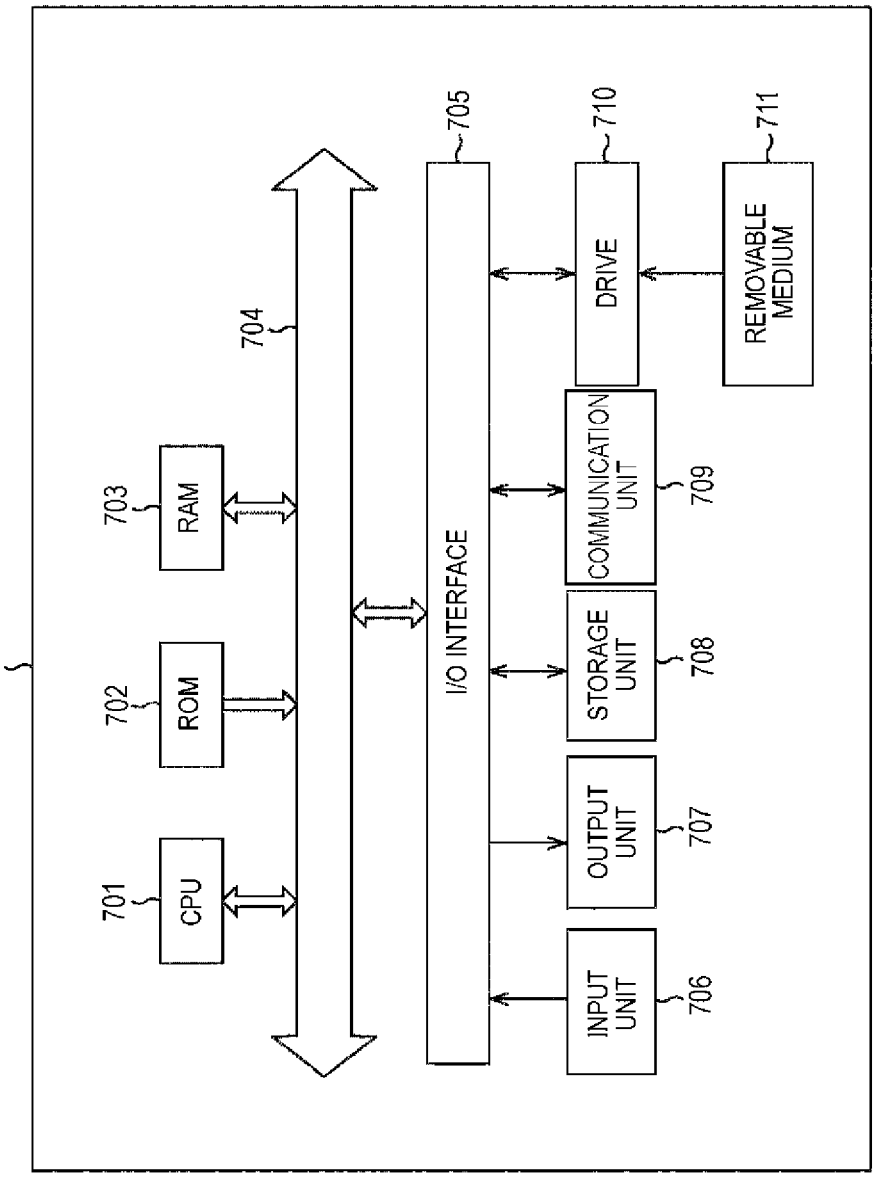

IMAGE PROCESSING APPARATUS AND METHOD, AND COMPUTER PROGRAM PRODUCT

TECHNICAL FIELD

The present disclosure relates to image processing apparatus, method, and a computer program product, and more particularly, to image processing apparatus, method, and a computer program product, which can allow a user to reliably perceive an icon or the like that is not selectable and to allow the icon or the like to displayed in a more enjoyable manner.

BACKGROUND ART

The expansion of a GUI (Graphical User Interface) function has been attempted from the related art.

For example, as a GUI that adopts an icon, a GUI that is displayed on a touchscreen which is collectively constructed by a display panel such as a liquid crystal panel that displays an icon or the like, and a touch panel that detects a touching by a user's finger.

In the GUI using the touchscreen, when the icon displayed on the touchscreen is touched, a function that is allocated to the icon is executed.

In addition, a technology in which the approach of a finger to a display screen is detected, and the icon is enlarged and displayed is also suggested (for example, refer to PTL1 and PTL2).

CITATION LIST

Patent Literature

PTL 1: JP-A-2006-236143
PTL 2: JP-A-2005-51876

SUMMARY OF INVENTION

Technical Problem

However, in a GUI (Graphical User Interface) or the like in the related art, a part (icon or the like) that is not selectable is generally displayed in a grayed-out state.

However, the display functions of recent touchscreens have steadily improved, and therefore a relatively enjoyable display is expected with respect to an icon that is not selectable.

In addition, for example, in a portable electronic apparatus that has a small-sized touchscreen, or the like, sometimes, it is difficult to discriminate whether or not a displayed icon is a grayed-out icon when seen from a user. In this case, even though this icon is not selectable, a user may repeat a selection operation plural times.

Under the circumstance, it is desirable to allow a user to reliably perceive an icon or the like that is not selectable and to allow the icon or the like to be displayed in an enjoyable manner.

Solution to Problem

In on exemplary embodiment a control unit includes
a control circuit that controls a depth display of a part of a graphical user interface displayed on a display, the control circuit deepens the depth of display of the part when an object is detected as approaching the display.

One aspect of the embodiment is that
the control unit deepens the depth of display by increasing a parallax of the part on the display.

Another aspect of the embodiment is that
the part is an icon displayed on the display.

Another aspect of the embodiment is that
the icon is a user-selectable icon and the control circuit deepens the depth of display when the object is detected as being within a predetermined distance from the icon.

Another aspect of the embodiment is that
the control circuit changes the icon from a first state to a second state that is perceived visually different than the first state.

According to another aspect of the embodiment is that it includes
a sensor that detects when the object is a predetermined distance from the display.

Another aspect of the embodiment is that it includes
the display, the display being a 3-dimensional display.

Another aspect of the embodiment is that
the 3-dimensional display presents a left image and a right image.

Another aspect of the embodiment is that
when the object is detected as approaching the icon, the icon is moved on the display in a direction other than a depth direction.

Another aspect of the embodiment is that
when the icon is detected as approaching the icon, the icon is moved on the display in a direction other than a direction in which the object approaches the icon.

Another aspect of the embodiment is that
when the control circuit moves the icon toward an inner portion of the display, the control circuit changes a color of the icon.

Another aspect of the embodiment is that
when the control circuit moves the icon toward an inner portion of the display, the control circuit changes a shape of the icon.

In a method embodiment, the method includes
displaying a graphical user interface on a display;
detecting an object approaching the display; and
controlling with a control circuit a depth display of a part of the graphical user interface, the controlling includes deepening the depth of display of the part when the object is detected as approaching the display.

According to one aspect of the embodiment,
the controlling includes deepening the depth of display by increasing a parallax of the part on the display.

Another aspect of the embodiment is that
the part is an icon displayed on the display.

Another aspect of the embodiment is that
the icon is a user-selectable icon and the control circuit deepens the depth of display when the object is detected as being within a predetermined distance from the icon.

According to a non-transitory computer readable storage medium embodiment, the medium has instructions stored therein that when executed by a processing circuit cause the processing circuit to execute a method, the method includes
displaying a graphical user interface on a display;
detecting an object approaching the display; and
controlling with a control circuit a depth display of a part of the graphical user interface, the controlling includes deepening the depth of display of the part when the object is detected as approaching the display.

One aspect of the embodiment is that
the controlling includes deepening the depth of display by increasing a parallax of the part on the display.

Another aspect of the embodiment is that the part is an icon displayed on the display.

Another aspect of the embodiment is that the icon is a user-selectable icon and the control circuit deepens the depth of display when the object is detected as being within a predetermined distance from the icon.

Advantageous Effects of Invention

According to the embodiments of the present disclosure, it is possible to allow a user to reliably perceive an icon or the like that is not selectable and to allow the icon or the like to be displayed in an amusing manner.

BRIEF DESCRIPTION OF DRAWINGS

FIG. 3 is a diagram illustrating an example in a case where an image is displayed with a parallax barrier turned on.

FIG. 4 is a diagram illustrating an example in a case where an image is displayed with the parallax barrier turned off.

FIG. 8 is a diagram illustrating an example of an image displayed on a touchscreen.

FIGS. 16A and 16B are diagrams illustrating still another example of the transition in the display screen of the touchscreen in a case where the icon is selected.

FIG. 20 is a block diagram illustrating a configuration example of a personal computer.

DESCRIPTION OF EMBODIMENTS

Hereinafter, an embodiment of the present disclosure will be described with reference to the attached drawings.

In an embodiment described below, a 3D image (an image that is displayed in a three-dimension) is displayed. Therefore, before describing an embodiment of the present disclosure, an outline of a method of generating the 3D image including a left eye image and a right eye image for ease of comprehension of an embodiment of the present disclosure will be provided.

Figure 1:
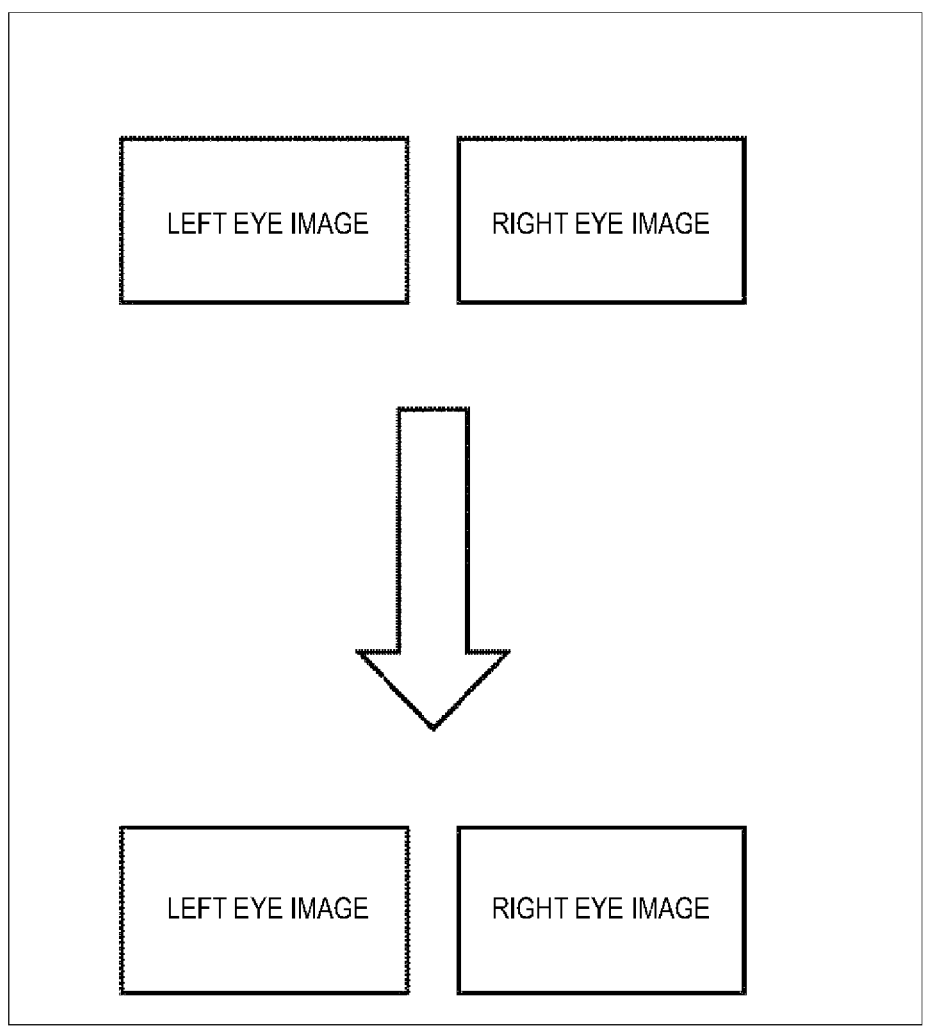
FIG. 1 is a diagram illustrating a method of generating a 3D image.

FIG. 1 shows a diagram illustrating a method of generating the 3D image.

A first generation method is a method using an imaging apparatus in which two lenses are provided. That is, in the first generation method, a user maintains the imaging apparatus in such a manner that the two lenses are disposed in an approximately horizontal direction, and takes a picture one time. Then, in the two lenses, data of a left eye image is generated by light that transmits through a left side lens and data of a right eye image is generated by light that transmits through a right side lens.

In addition, the left eye image data and the right eye image data may be generated corresponding to an image generated by CG (computer graphics) without using an imaging apparatus or the like.

Each of the left eye image and the right eye image generated in this way includes a corresponding object at a position spaced in correspondence with the distance between two lenses of the imaging apparatus. Here, the difference (that is, the distance) between an arranged position in a substantially horizontal direction of the corresponding object included in each of the left eye image and the right eye image is referred to as the parallax. The larger the parallax is, the deeper the depth of the object that is displayed three-dimensionally becomes. That is, the degree of unevenness becomes stronger. Therefore, parallax having the above-described characteristics may be used as a parameter that determines the degree of unevenness of object displayed three-dimensionally.

Figure 2:
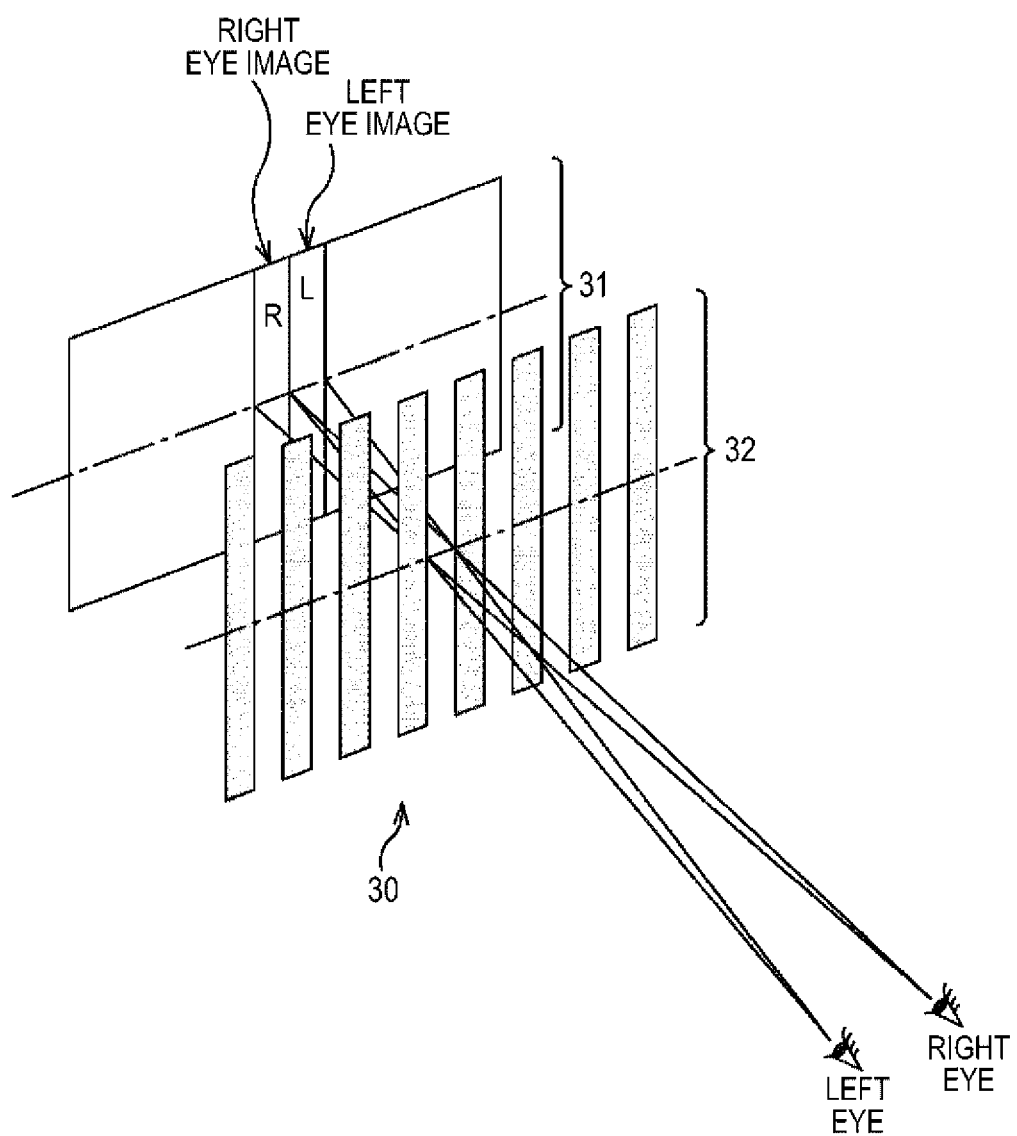
FIG. 2 is a diagram illustrating a configuration example of a display that displays the 3D image.

FIG. 2 shows a diagram illustrating a configuration example of a display that displays the above-described 3D image. The display shown in the same drawing is a 3D display 30 that displays a 3D image with a system called a parallax barrier system, and allows a user to sense the unevenness of the object displayed three-dimensionally through an observation of the 3D display 30 with the naked eye.

As shown in FIG. 2, the 3D display 30 includes a display layer 31 and a parallax barrier layer 32. In the display layer 31, the left eye image and the right eye image are displayed alternately for each unit pixel (one column) in the horizontal direction. In the same drawing, a column of the display layer 31 in which the left eye image is displayed is indicated by "L", and a column in which the right eye image is displayed, is indicated by "R".

The parallax barrier layer 32 is formed of a lattice-type barrier having the same periodic column as that of the image on the display layer 31, and the width of an opening portion of the barrier is set to have the same width as that of one image column on the display layer 31. When a user views the image displayed on the display layer 31 from a position spaced with a predetermined distance through the parallax barrier layer 32, "L" and "R" images are separately presented to the left and right eyes of the user and therefore parallax occurs.

For example, as shown in FIG. 3, when a user 40 views an image displayed on the display layer 31 from a position spaced with a predetermined distance through the parallax barrier layer 32, an image composed of columns of a left eye image is presented to a left eye of the user 40, and an image composed of columns of a right eye image is presented to a right eye of the user 40. In an example of the same drawing, an image composed of each column of "L1 (represents a first left eye image)", . . . , "Ln (represents an n-th left eye image)", . . . , "LN (represents an N-th left eye image)" is presented to the left eye of the user 40. In addition, an image composed of each column of "R1 (represents a first right eye image)", . . . , "Rn (represents an n-th right eye image)", . . . , "RN (represents an N-th right eye image)" is presented to the right eye of the user 40.

In this way, it is possible to allow the user 40 to sense the unevenness of the object that is displayed three-dimensionally by observing the 3D display 30 with the naked eye. In addition, the image observed through the parallax barrier layer 32 can represent a half of the resolution which the display layer 31 originally has in the horizontal direction. Therefore, the 3D display 30 can display an image with the parallax barrier turned on as shown in FIG. 3, and can display the image with the parallax barrier turned off as shown in FIG. 4.

FIG. 4 shows a diagram illustrating an example where the image is displayed with the parallax barrier turned off. In the case of the example in FIG. 4, an image displayed in each column of the display layer 31 is presented to the left eye and the right eye of the user 40, respectively. Therefore, in a case where the image is displayed with the parallax barrier turned off, images "LR1", "LR2", . . . , which are presented to both the left and right eyes, are displayed in each column of the display layer 31, and therefore the image can be displayed with the resolution which the display layer 31 originally has in the horizontal direction. However, in the case of FIG. 4, since the image having parallax is not presented to the user, it is difficult to display the image three-dimensionally and only two-dimensional display (2D display) may be performed.

In this way, the 3D display 30 is configured to display an image three-dimensionally as shown in FIG. 3, or 2D-display an image as shown in FIG. 4.

Figure 5A:
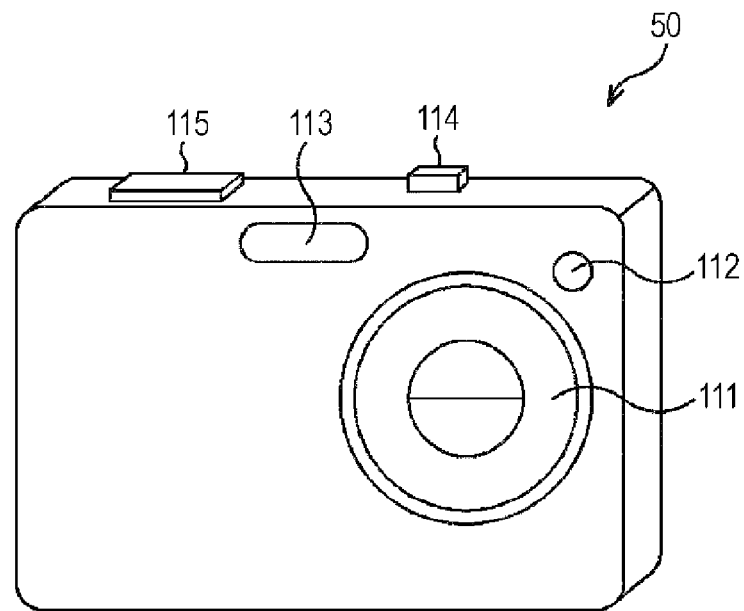
FIGS. 5A and 5B are diagrams illustrating an appearance configuration example of an imaging apparatus as an embodiment of an image processing apparatus to which a technology of the present disclosure is applied.
Figure 5B:
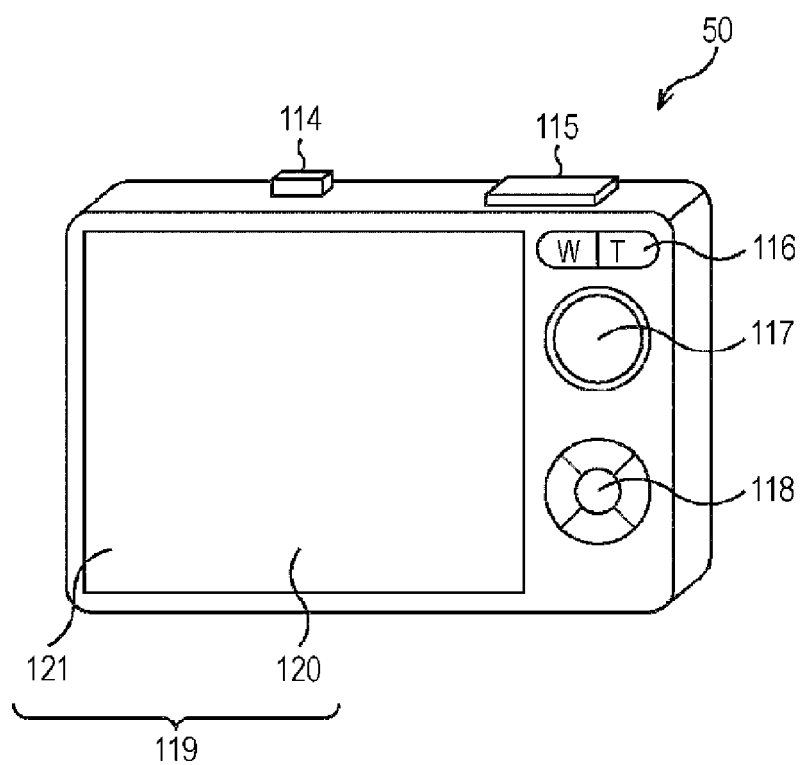

FIGS. 5A and 5B show diagrams illustrating an appearance configuration example of an imaging apparatus 50 as an embodiment of an image processing apparatus to which a technology of the present disclosure is applied.

FIG. 5A shows the front face of the imaging apparatus 50 and FIG. 5B shows the rear face thereof, respectively.

As shown in FIG. 5A, for example, at the right side of the front face of the imaging apparatus 50 configured as a digital camera, a lens unit 111 is provided. The lens unit 111 includes an optical system such as a lens that condenses light transmitted from a subject, a focus lens that adjusts a focus, an aperture, and the others (all not shown). The lens unit 111 protrudes from a casing of the imaging apparatus 50 when a power of the imaging apparatus 50 is turned on, and is accommodated in the casing of the imaging apparatus 50 when the power is turned off. In FIG. 5A, the lens unit 111 is accommodated in the casing of the imaging apparatus 50.

At the upper-right side of the lens unit 111 at the front face of the imaging apparatus 50, an AF (auto focus) auxiliary light transmitting unit 112 is provided. The AF auxiliary light transmitting unit 112 emits light as AF auxiliary light in an optical axis direction of an optical system of the lens unit 111 and thereby illuminates a subject. In this manner, for example, a so-called auto focus function operates, in which even in a dark place, an image of the subject is captured, and the subject is brought into focus based on the image.

At the upper-middle side of the front face of the imaging apparatus 50, a strobe 113 is disposed.

At the right side of the top face of the imaging apparatus 50 when seen from the front face side, a power button 114 that is operated when turning on and off the power is provided, and at the left side thereof when seen from the front face side, a shutter button (release button) 115 that is operated when recording an image that is captured is provided.

As shown in FIG. 5B, at the upper-right side of the rear face of the imaging apparatus 50, a zoom button 116 is provided.

For example, when a user captures an image of the subject by using the imaging apparatus 50, when making an instruction of a telephoto (Tele), the user presses a portion (hereinafter, referred to as a T button) marked by "T" in the zoom button 116. On the other hand, when making an instruction of a wide angle (Wide), the user presses a portion (hereinafter, referred to as a W button) marked by "W" in the zoom button 116. In addition, the user may make an instruction of the telephoto (Tele) or the wide angle (Wide) in succession by maintaining a pressed state of the T button or W button.

At a lower side of the zoom button 116, a mode dial 117 is provided. This mode dial 117 is operated when various modes of the imaging apparatus 50 are selected, or the like. As an operation mode of the imaging apparatus 50, for example, a photographing mode at which a subject is photographed, or an image display mode at which a photographed image obtained as a result of the photographing of the subject is displayed may be exemplified. In addition, as a mode related to various operations at the photographing mode, a mode where the lighting of the strobe 113 is forcibly turned on or off, a mode where a self-timer is used, a mode where a menu screen is displayed on a liquid crystal panel 120 described later, or the like may be exemplified.

At a lower side of the mode dial 117, an operation button 118 is provided. This operation button 118 is used when the user performs an instruction operation allocated in advance.

For example, the user operates the operation button 118 and thereby moves a cursor on the menu screen, and as a result thereof can select an item present in an arranged position of the cursor.

A touchscreen 119 includes the liquid crystal panel 120 and an approach panel 121 disposed on the liquid crystal panel 120, which are integrally formed. The touchscreen 119 displays various images by the liquid crystal panel 120 and receives an operation of the user by the approach panel 121.

The liquid crystal panel 120 is configured, for example, as a display having the same configuration as that of the 3D display 30 described above with reference FIGS. 2 to 4, and is configured to display an image two-dimensionally or three-dimensionally as necessary.

The approach panel 121 detects a variance in an electrostatic capacitance through the same method as a touchscreen of an electrostatic capacitance method and thereby detects that the user's finger or the like approaches thereto. The approach panel 121 detects a variance in an electrostatic capacitance at a predetermined position on a panel and outputs a signal indicating how much the user's finger or the like approaches at that position.

Figure 6:
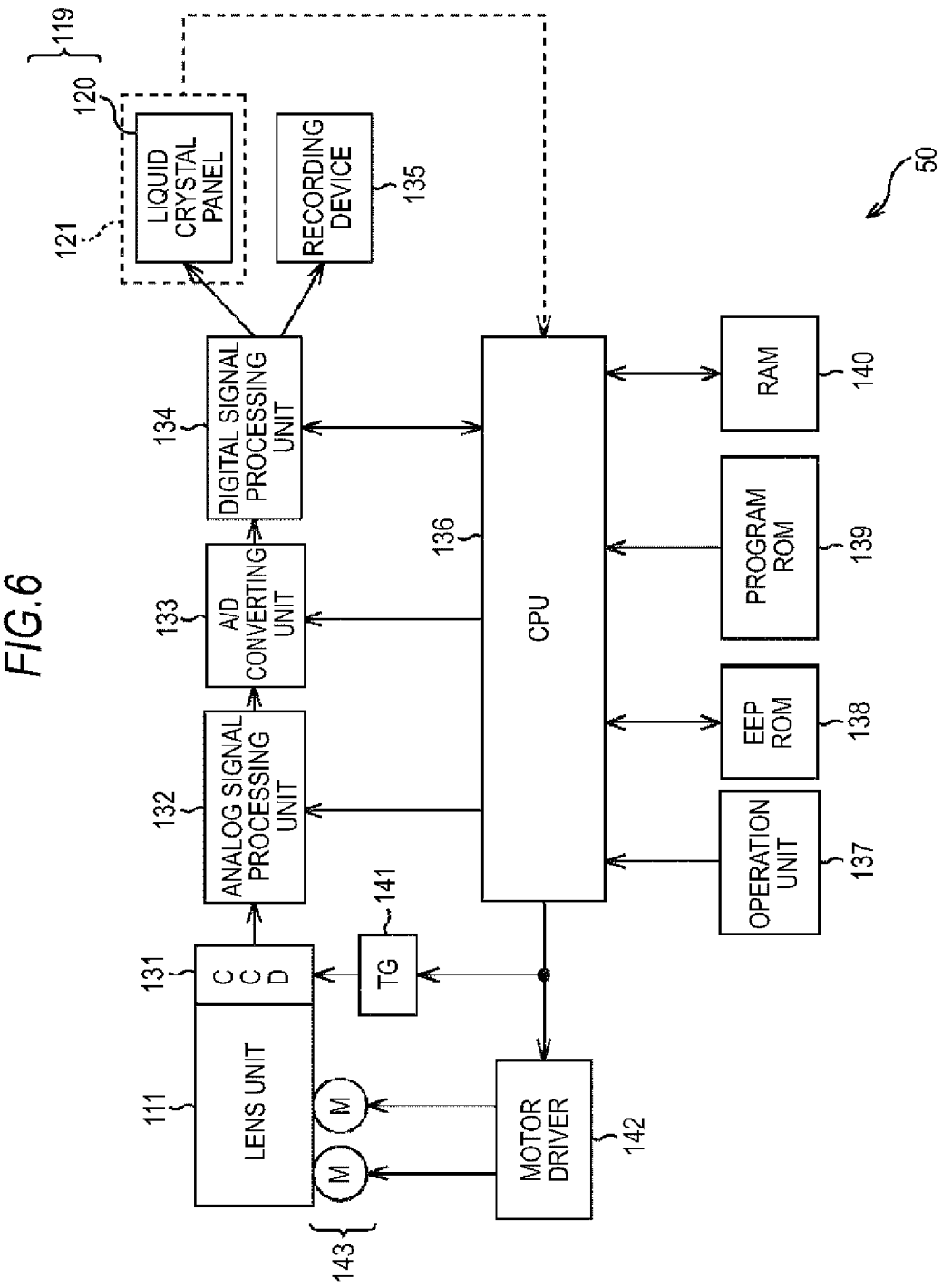
FIG. 6 is a block diagram illustrating an internal configuration example of the imaging apparatus in FIGS. 5A and 5B.

FIG. 6 shows a block diagram illustrating an internal configuration of the imaging apparatus 50 in FIGS. 5A and 5B.

In addition, in FIG. 6, the AF auxiliary light transmitting unit 112 and the strobe 113 in FIGS. 5A and 5B are not drawn.

A CCD (charge coupled device) 131 operates according to a timing signal supplied from a timing generator (TG) 141.

The CCD 131 receives light from a subject, which is incident through the lens unit 111 and performs a photoelectric conversion, and supplies an analog image signal as an electric signal, which corresponds to the amount of light received, to an analog signal processing unit 132.

The analog signal processing unit 132 performs an analog signal processing such as an amplification of an analog image signal supplied from the CCD 131, or the like, according to a control of a CPU (Central Processing Unit) 136, and supplies the image signal, which is obtained as a result of the analog signal processing, to an A/D (analog/digital) converting unit 133.

The A/D converting unit 133 A/D-converts an image signal, which is an analog signal supplied from the analog signal processing unit 132, according to a control of the CPU 136, and supplies the image data, which is a digital signal obtained as a result of the conversion, to a digital signal processing unit 134.

According to a control of the CPU 136, the digital signal processing unit 134 performs a digital signal processing such as the removal of noise with respect to the image data supplied from the A/D converting unit 133, and supplies the image data after the processing to the liquid crystal panel 120. In this manner, on the liquid crystal panel 120, an image corresponding to data of the supplied image, that is, a photographed image (hereinafter, referred to as a through-the-lens image) while being photographed is displayed. In addition, the digital signal processing unit 134 compresses and encodes the image data supplied from the A/D converting unit 133 through, for example, a JPEG (joint photographic experts group) method or the like, and supplies the compressed and encoded data obtained as a result thereof to a recording device 135 to be recorded therein. In addition, the digital signal processing unit 134 decompresses and decodes the compressed and encoded data that is recorded in the recording device 135 and supplies the image data obtained as a result thereof to the liquid crystal panel 120. In this manner, on the liquid crystal panel 120, an image that corresponds to data of the supplied image, that is, a recorded photographed image is displayed.

In addition, the digital signal processing unit 134 controls a display of a GUI (for example, a menu screen described later) that is displayed on the liquid crystal panel 120 according to a control of the CPU 136.

The recording device 135 includes, for example, a disc such as a DVD (Digital Versatile Disc), a semiconductor memory such as a memory card, and other removable recording medium, and is provided to be easily detached from the imaging apparatus 50. In the recording device 135, data of the photographed image is recorded.

The CPU 136 executes a program that is recorded in a program ROM (Read Only Memory) 139, and controls each unit making up the imaging apparatus 50, and performs various processes according to a signal supplied from the approach panel 121 or a signal supplied from an operation unit 137.

The operation unit 137 is operated by a user and supplies a signal corresponding to the operation to the CPU 136. In addition, the operation unit 137 includes the power button 114, the shutter button 115, the zoom button 116, the mode dial 117, the operation button 118, or the like shown in FIGS. 5A and 5B.

An EEPROM (Electrically Erasable Programmable ROM) 138 stores data or the like that is necessary to be maintained even when the power of the imaging apparatus 50 is turned off, in addition to various kinds of information set to the imaging apparatus 50, according to the control of the CPU 136.

The program ROM 139 stores a program, which is executed by the CPU 136, and data necessary in order for the CPU 136 to execute a program. A RAM (Random Access Memory) 140 temporarily stores a program or data, which is necessary in order for the CPU 136 to perform various processes.

The timing generator 141 supplies a timing signal to the CCD 131 according to a control of the CPU 136. An exposure time (shutter speed) in the CCD 131, or the like is controlled by the timing signal supplied from the timing generator 141 to the CCD 131.

A motor driver 142 drives an actuator 143 including a motor according to a control of the CPU 136. When the actuator 143 is driven, the lens unit 111 protrudes from the casing of the imaging apparatus 50 or is accommodated in the casing of the imaging apparatus 50. In addition, when the actuator 143 is driven, an adjustment of the aperture making up the lens unit 111, or a movement of the focus lens making up the lens unit 111 is performed.

In the imaging apparatus 50 configured as described above, the CCD 131 receives light from a subject, which is incident through the lens unit 111, and performs a photoelectric conversion, and outputs an analog image signal obtained as a result of the conversion. The analog image signal output from the CCD 131 is made into image data of a digital signal when being passed through the analog signal processing unit 132 and the A/D converting unit 133, and is supplied to the digital signal processing unit 134.

The digital signal processing unit 134 supplies image data supplied from the A/D converting unit 133 to the liquid crystal panel 120, and as a result thereof, on the liquid crystal panel 120, a through-the-lens image is displayed.

When a user operates the shutter button 115 (FIGS. 5A and 5B), a signal corresponding to the operation is supplied from the operation unit 137 to the CPU 136. When the signal corresponding to the operation of the shutter button 115 is supplied from the operation unit 137, the CPU 136 controls the digital signal processing unit 134 to compress the image data supplied from the A/D converting unit 133 to the digital signal processing unit 134, and to record the compressed image data obtained as a result of the compression in the recording device 135.

In this manner, so-called photographing is performed.

In addition, the CPU 136 executes a predetermined program and thereby generates image data of a 3D image.

In the case of generating the 3D image, the CPU 136 sets parallax d. In a case where the parallax d is set to have a large value, a sense of perspective (degree of unevenness of an object that is displayed three-dimensionally) of an object displayed with an image having parallax becomes large. For example, in a case where the parallax d is set to have a large value, at the side of the user who observes a screen, it feels as if the object protrudes forward greatly from the screen (or as if the screen is drawn in deeply).

On the other hand, when the parallax d is set to have a small value, a sense of perspective (a degree of unevenness of an object that is displayed three-dimensionally) of an object displayed with an image having parallax becomes small. For example, in a case where the parallax d is set to have a small value, at the side of the user who observes a screen, it feels as if the object is present to be substantially flush with the screen.

The CPU 136 acquires image data that becomes an origin of the generation of the 3D image, sets a region to be processed, in which an object to be displayed three-dimensionally is displayed, and sets a reference point P at a predetermined position of the region to be processed in the horizontal direction. The CPU 136 generates respective data of left and right regions that are spaced from the reference point P with the same distance determined in correspondence with the parallax d as left eye image data and right eye image data.

Images corresponding to the left eye image data and the right eye image data, which are generated in this manner and have the parallax d, are displayed on the touchscreen 119, and therefore the user is able to observe the 3D image.

Figure 7:
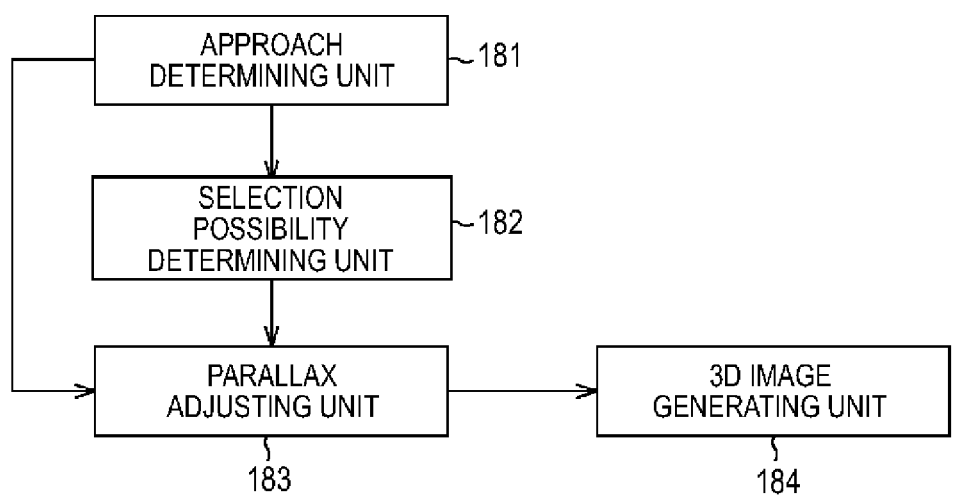
FIG. 7 is a block diagram illustrating a functional configuration example of software executed by a CPU.

FIG. 7 shows a block diagram illustrating a functional configuration example of software of a program or the like that is executed by the CPU 136.

An approach determining unit 181 determines a degree of approach of the user's finger or the like with respect to the touchscreen 119, based on an approach detection signal output from an approach panel 121. For example, when the user's finger or the like approaches to the touchscreen 119 until a distance from the touchscreen 119 becomes less than a predetermined threshold value, the approach determining unit 181 generates and outputs predetermined data indicating this situation. In addition, when the user's finger or the like, which approached to the touchscreen 119, goes away from the touchscreen 119 until a distance from the touchscreen 119 becomes equal to or larger than a predetermined threshold value, the approach determining unit 181 generates and outputs data indicating this situation. In addition, in the data generated by the approach determining unit 181, information indicating whether the user's finger or the like approaches to a portion of the touchscreen 119 (the approach panel 121) or the like is included.

A selection possibility determining unit 182 specifies an object which a user is to select based on, for example, information that is included in data output from the approach determining unit 181 and indicates whether the user's finger or the like approaches to which portion of the touchscreen 119. For example, an icon or the like that is displayed on the touchscreen 119 is specified as the object which the user is to select.

In addition, the selection possibility determining unit 182 determines whether or not the specified object is a selectable object. That is, it is determined whether or not the execution of a function or the like, which is allocated to the object such as the icon, is permitted. For example, when the photographing is performed in a mode where the lighting of a strobe 113 is forcibly turned off, it is determined that an icon that performs a setting for lighting the strobe 113 is an object that is not selectable.

In a case where it is determined that the specified object is not a selectable object (not selectable object), the selection possibility determining unit 182 outputs information indicating this situation to a parallax adjusting unit 183.

In a case where the object specified by the selection possibility determining unit 182 is not selectable object, the parallax adjusting unit 183 sets parallax related to a 3D display with respect to the object. For example, the degree of approach of the user's finger or the like is specified based on data output from the approach determining unit 181 and the parallax of the 3D image is set based on this degree of approach. For example, in a case where it is specified that the user's finger approaches to a distance less than a first threshold value, parallax d1 is set, and in a case where it is specified that the user's finger approaches to a distance less than a second threshold value smaller than the first threshold value, parallax d2 larger than the parallax d1 is set.

In addition, the parallax adjusting unit 183 acquires data of an image (for example, an image of a menu screen described later) that becomes an origin of the generation of the 3D image, and specifies a region to be processed in which an object to be displayed three-dimensionally is displayed. At this time, for example, the object that is specified by the selection possibility determining unit 182 is specified as an object to be displayed three-dimensionally. The parallax adjusting unit 183 sets a reference point P, for example, at a central position of an object to be displayed three-dimensionally.

The information related to the parallax and the reference point P that are set by the parallax adjusting unit 183 is output to a 3D image generating unit 184.

The 3D image generating unit 184 generates respective data of left and right regions that are spaced from the above-described reference point with the same distance determined in correspondence with the parallax as left eye image data and right eye image data. In this manner, data of the 3D image is generated.

FIG. 8 shows an example of an image displayed on the touchscreen 119. FIG. 8 is regarded as a menu screen displayed when, for example, a mode in which a menu screen is displayed is selected by the above-described mode dial 117 in the imaging apparatus 50.

In this menu screen, various icons are displayed. For example, at the upper-right side in the drawing, a garbage can icon 201 is displayed.

A user approaches to an icon displayed on the touchscreen 119 using a finger and may select a desired icon. When the icon is selected, a function corresponding to the icon is executed or a predetermined setting is performed.

For example, when the user selects the icon 201 in a state where a thumbnail (not shown) or the like of photographed image data, which is recorded in advance in the recording device 135, is selected, image data corresponding to the thumbnail is deleted.

On the other hand, in a state where the user does not select the thumbnail or the like of the photographed image data, the icon 201 becomes a not selectable icon.

With reference to FIGS. 9A to 11B, description will be made with respect to a transition of a display screen of the touchscreen 119 in a case where the icon 201 is selected by a user.

Figure 9A:
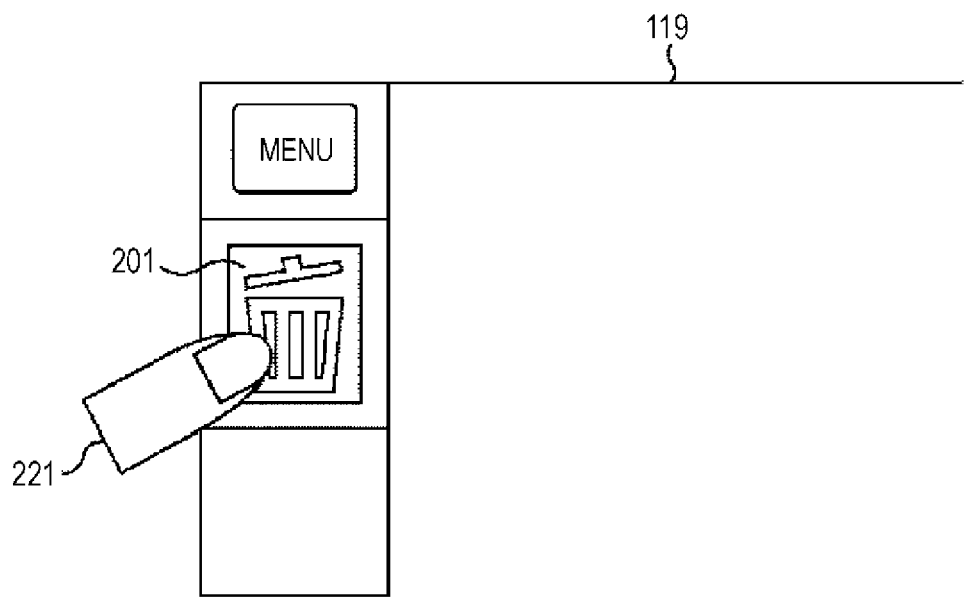
FIGS. 9A and 9B are diagrams illustrating a transition in a display screen of the touchscreen in a case where an icon is selected.

FIG. 9A shows a diagram illustrating an example of an image obtained when the touchscreen 119 is observed with the user's eyes. As shown in FIG. 9A, a user approaches to a portion, on which the icon 201 is displayed, of the touchscreen 119 by using a finger 221. At this time, it is assumed that the finger 221 does not sufficiently approach to the touchscreen 119. For example, it is assumed that the distance between the finger 221 and the touchscreen 119 is equal to or larger than a threshold value Th1.

Figure 9B:
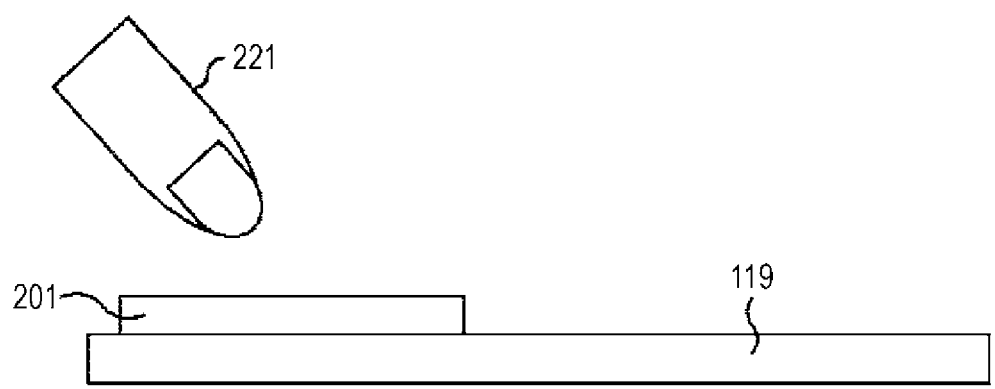

FIG. 9B shows a diagram that is obtained when the user views the touchscreen 119 from a left side direction of FIG. 9A, and that illustrates a virtual sense of the distance between the icon 201 of the touchscreen 119 and the finger 221, which the user perceives as a result of observing the touchscreen 119. In addition, FIG. 9B illustrates a sense of perspective which the user perceives from a 3D image, and actually, the icon 201 is just an image that is displayed on the surface of the touchscreen 119 (that is, a planar article not having thickness and depth).

As shown in FIG. 9B, the icon 201 is not drawn toward the inside of the touchscreen 119. That is, the distance between the finger 221 and the touchscreen 119 is equal to or larger than a threshold value Th1, such that an image having parallax is not generated, and the icon 201 seen from a user appears to be located on the surface of the touchscreen 119.

Figure 10A:
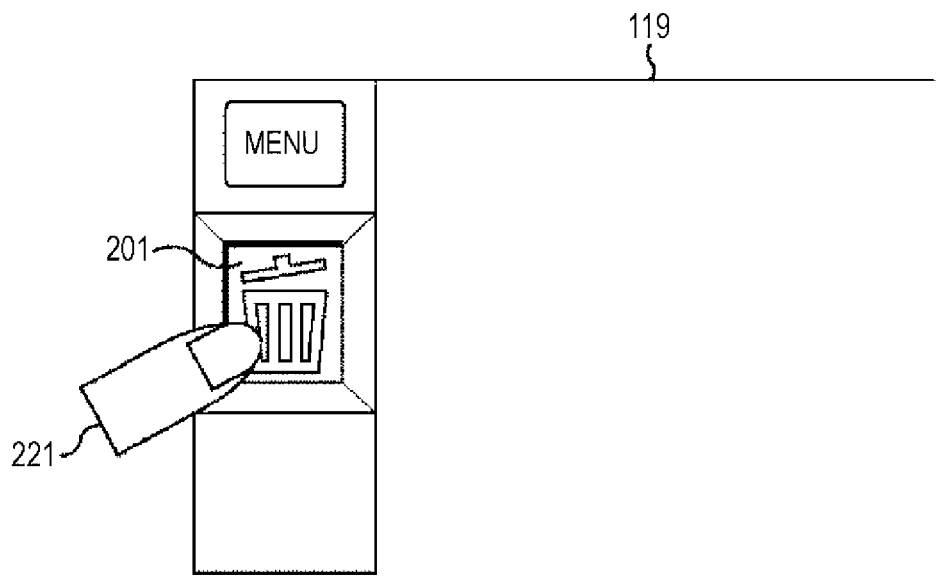
FIGS. 10A and 10B are diagrams illustrating the transition in the display screen of the touchscreen in a case where the icon is selected.

FIG. 10A illustrates another example of an image obtained when the touchscreen 119 is observed with the user's eyes. As shown in FIG. 10A, a user further approaches to a portion, on which the icon 201 is displayed, of the touchscreen 119 by using a finger 221. At this time, for example, it is assumed that the distance between the finger 221 and the touchscreen 119 is less than the threshold value Th1 and is equal to or larger than a threshold value Th2.

Figure 10B:
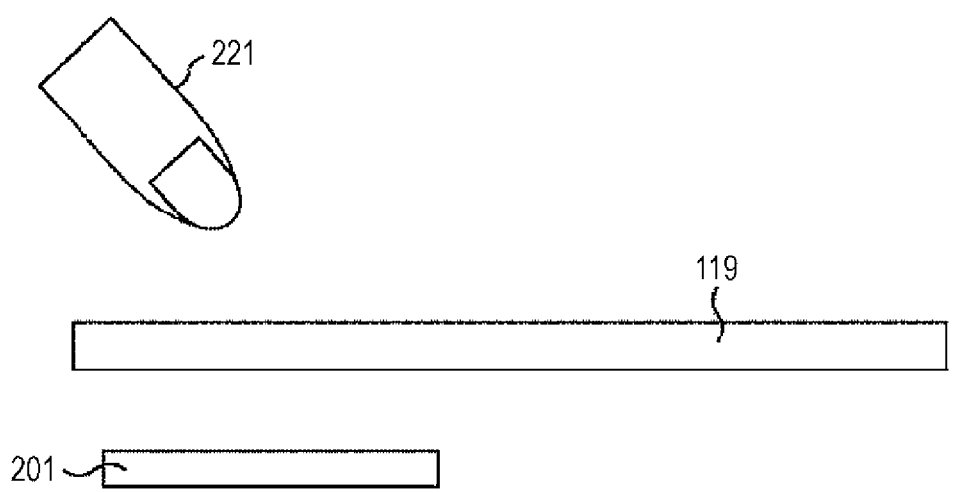

FIG. 10B shows a diagram that is obtained when the touchscreen 119 is seen from a left side direction of FIG. 10A, and that illustrates a virtual sense of the distance between the icon 201 of the touchscreen 119 and the finger 221, which the user perceives as a result of observing the touchscreen 119. In addition, FIG. 10B illustrates a sense of perspective which the user perceives from a 3D image, and actually, the icon 201 is just an image that is displayed on the surface of the touchscreen 119 (that is, a planar article not having thickness and depth).

As shown in FIG. 10B, the icon 201 is drawn toward the inside of the touchscreen 119 in the depth direction thereof, and is apart from the finger 221. That is, the distance between the finger 221 and the touchscreen 119 is less than the threshold value Th1, such that an image having parallax is generated, and the icon 201 seen from a user looks as if it is drawn toward the inside of the touchscreen 119.

In addition, here, a state where an icon moves (appears to move) in a downward direction from a surface of the touchscreen 119 in the drawing is expressed by "is drawn toward the inside of the touchscreen 119".

Figure 11A:
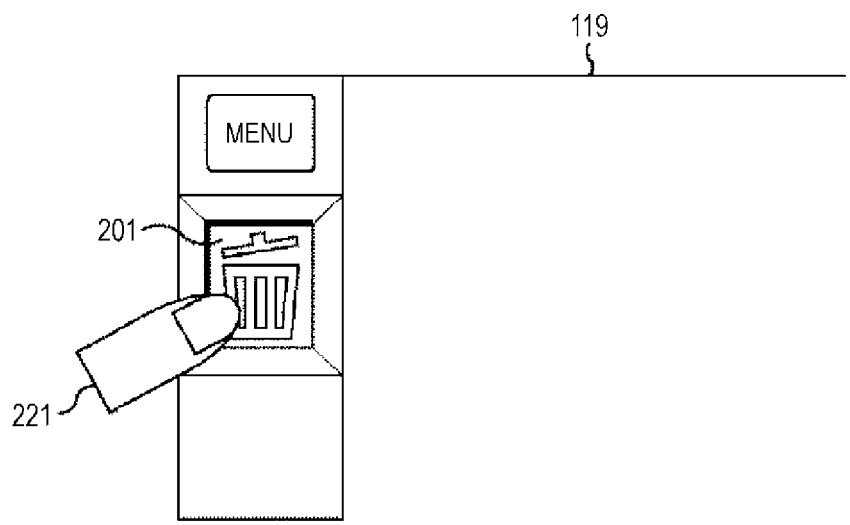
FIGS. 11A and 11B are diagrams illustrating the transition in the display screen of the touchscreen in a case where the icon is selected.

FIG. 11A illustrates still another example of an image obtained when the touchscreen 119 is observed with the user's eyes. As shown in FIG. 11A, a user further approaches to a portion, on which the icon 201 is displayed, of the touchscreen 119 by using a finger 221. At this time, for example, it is assumed that the distance between the finger 221 and the touchscreen 119 is less than the threshold value Th2.

Figure 11B:
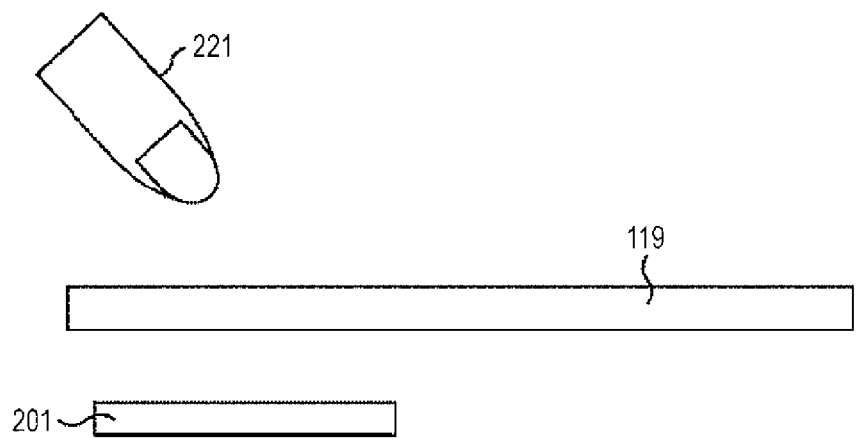

FIG. 11B shows a diagram that is obtained when the touchscreen 119 is seen from a left side direction of FIG. 11A, and that illustrates a virtual sense of the distance between the icon 201 of the touchscreen 119 and the finger 221, which the user perceives as a result of observing the touchscreen 119. In addition, FIG. 11B illustrates a sense of perspective which the user perceives from a 3D image, and actually, the icon 201 is just an image that is displayed on the surface of the touchscreen 119 (that is, a planar article not having thickness and depth).

As shown in FIG. 11B, the icon 201 is further drawn toward the inside of the touchscreen 119. That is, the distance between the finger 221 and the touchscreen 119 is less than the threshold value Th2, such that an image having a still larger parallax is generated, and the icon 201 seen from a user looks as if it is further drawn to the inside of the touchscreen 119.

In this manner, the user may clearly come to feel that the icon 201 is an icon that is not selectable. In addition, in this manner, it is possible to feed back the selection operation of the icon to the user, such that it is possible to allow the user to clearly come to feel that the icon 201 cannot be selected.

In addition, it is possible to present an enjoyable screen with a 3D display, differently from a case where the icon 201 is only grayed out.

In addition, when the menu screen is displayed three-dimensionally, a predetermined effect sound or the like may be output.

Figure 12:
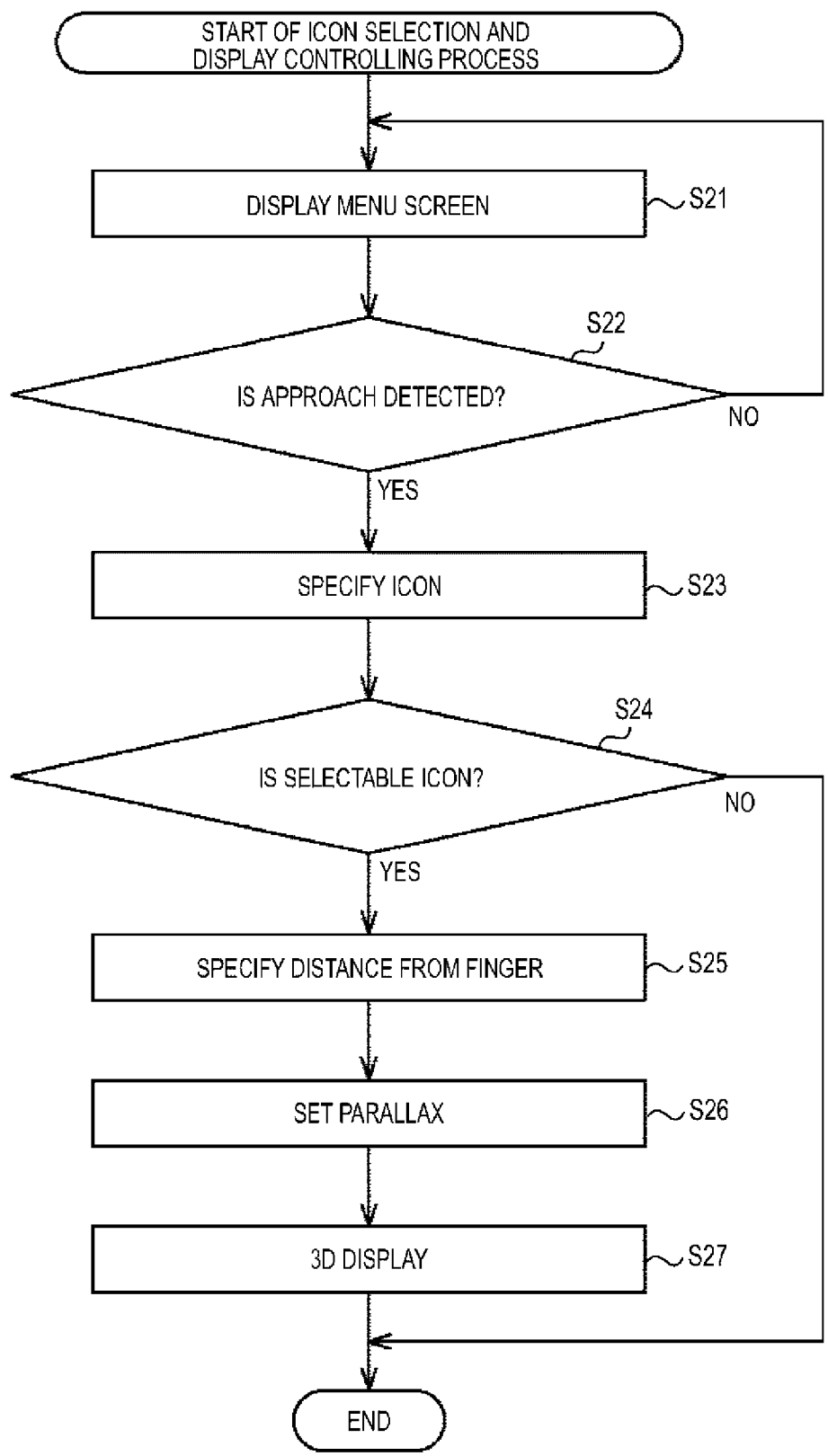
FIG. 12 is a diagram illustrating an example of an icon selection and display controlling process.

Next, an example of an icon selection and display controlling process performed by the imaging apparatus 50 will be described with reference to a flowchart of FIG. 12. This process is performed, for example, when the imaging apparatus 50 receives a user's operation through the touchscreen 119.

In step S21, the CPU 136 controls the digital signal processing unit 134 and displays the menu screen on the liquid crystal panel 120 (the touchscreen 119).

In this manner, for example, the menu screen described above with reference to FIG. 8 is displayed.

In step S22, the approach determining unit 181 determines whether or not the approach of the user's finger 221 is detected, and when it is determined that the finger 221 has not yet approached, the process returns to step S21. For example, in the case of the state shown in FIGS. 9A and 9B, it is determined that the user's finger 221 has not yet approached.

In a case where it is determined that the approach of the user's finger 221 is detected in step S22, the process proceeds to step S23. For example, in the case of the state shown in FIGS. 10A and 10B, it is determined that the approach of the user's finger 221 is detected. For example, in a case where the distance between the finger 221 and the touchscreen 119 is less than a threshold value Th1, it is determined that the approach of the user's finger 221 is detected.

In step S23, the selection possibility determining unit 182 specifies an icon which the user is to select. At this time, for example, the icon which the user is to select is specified based on information that is included in data output from the approach determining unit 181 and that indicates that the user's finger approaches which portion of the touchscreen 119.

In step S24, the selection possibility determining unit 182 determines whether or not the object specified by the process in step S23 is a selectable object. In step S24, in a case where it is determined that the object is an object that is not selectable, the process proceeds to step S25.

In step S25, the parallax adjusting unit 183 specifies the distance between the touchscreen 119 and the finger 221. The distance between the touchscreen 119 and the finger 221 is specified based on, for example, the degree of approach, which is obtained based on data output from the approach determining unit 181.

In step S26, the parallax adjusting unit 183 sets parallax of the 3D image generated by the 3D image generating unit 184. At this time, for example, parallax corresponding to the distance specified in step S25 is set. For example, in a case where it is specified that the user's finger approaches to a distance less than a first threshold value, parallax d1 is set, and in a case where it is specified that the user's finger approaches to a distance less than a second threshold value smaller than the first threshold value, parallax d2 larger than parallax d1 is set.

In addition, at this time, for example, the object specified by the selection possibility determining unit 182 is specified as an object to be displayed three-dimensionally, and the parallax adjusting unit 183 sets a reference point P, for example, at a central position of the object to be displayed three-dimensionally.

In step S27, the 3D image generating unit 184 generates data as left eye image data and right eye image data based on the parallax set in the process in step S26 and the reference point. In this manner, the 3D image data is generated. In addition, based on this 3D image data, the menu screen of the touchscreen 119 is displayed three-dimensionally.

In this manner, an icon selection and display controlling process is performed. In this way, for example, as described above with reference to FIG. 9A to FIG. 11B, when the user's finger 221 approaches to the icon 201, it looks as if the icon 201 is drawn toward the inside of the touchscreen 119. In addition, when the user's finger 221 further approaches to the icon 201, it looks as if the icon 201 further drawn to the inside of the touchscreen 119.

Therefore, it is possible to allow the user to clearly come to feel that the icon 201 is an icon that is not selectable, by a funny expression using a 3D display.

In addition, in the above-described example, an example where when the finger approaches, the icon is displayed to look as if it is drawn in the inner side of the touchscreen, but the icon may be displayed in other ways. For example, the display may be performed in such a manner that an icon which looks as if it protrudes from the touchscreen appears to sink when the finger approaches to the icon. The point is that the display data may be generated such that when the finger approaches to the icon, the icon looks as if it goes away from the finger.

However, in the example described above with reference to FIGS. 9A to 11B, an example in which when the user's finger 221 approaches, the icon 201 moves (appears to move) in the vertically downward direction of a screen of the touchscreen 119, but the icon 201 may move in another direction.

FIGS. 13A to 14B show diagrams illustrating another example of a transition of a display screen of the touchscreen 119 when the icon 201 is selected by the user.

Figure 13A:
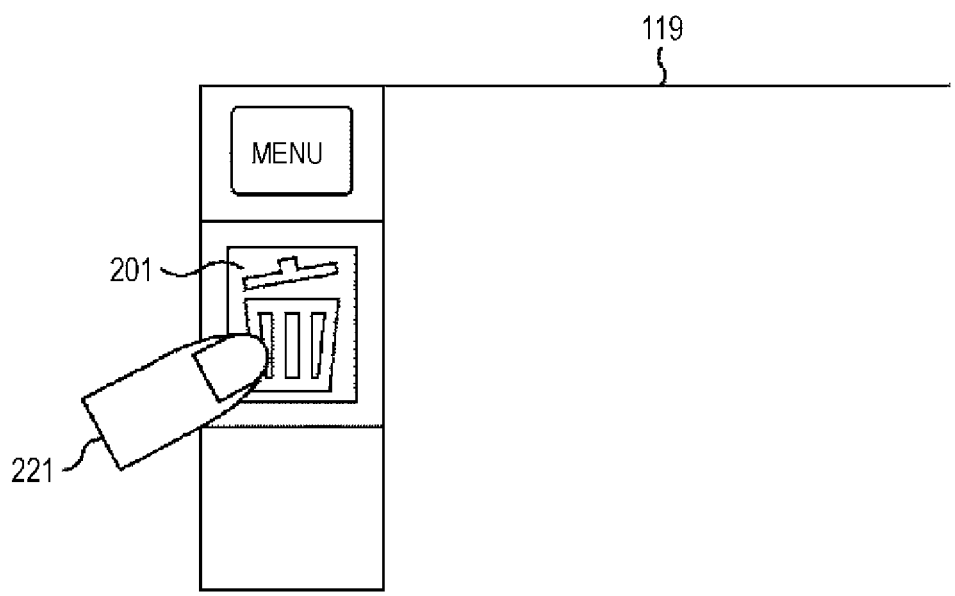
FIGS. 13A and 13B are diagrams illustrating another example of the transition in the display screen of the touchscreen in a case where the icon is selected.

FIG. 13A shows a diagram illustrating an example of an image obtained when the touchscreen 119 is observed with the user's eyes. As shown in FIG. 13A, the user approaches to a portion, on which the icon 201 is displayed, of the touchscreen 119 by using a finger 221. At this time, it is assumed that the finger 221 does not sufficiently approach to the touchscreen 119. For example, it is assumed that the distance between the finger 221 and the touchscreen 119 is equal to or larger than a threshold value Th1.

Figure 13B:
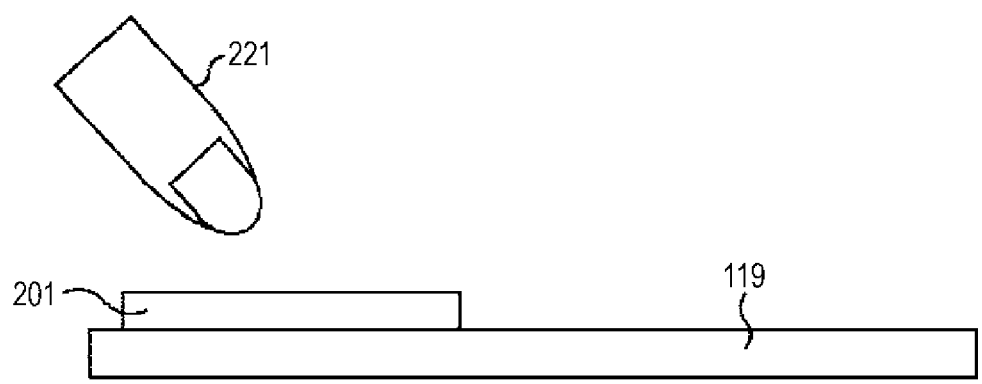

FIG. 13B shows a diagram that is obtained when the user views the touchscreen 119 from the downward direction of FIG. 13A, and that illustrates a virtual sense of the distance between the icon 201 of the touchscreen 119 and the finger 221, which the user perceives as a result of observing the touchscreen 119. In addition, FIG. 13B illustrates a sense of perspective which the user perceives from a 3D image, and actually, the icon 201 is just an image that is displayed on the surface of the touchscreen 119.

As shown in FIG. 13B, the icon 201 is not drawn toward the inside of the touchscreen 119. That is, the distance between the finger 221 and the touchscreen 119 is equal to or larger than a threshold value Th1, such that an image having parallax is not generated, and the icon 201 seen from a user appears to be located on the surface of the touchscreen 119.

Figure 14A:
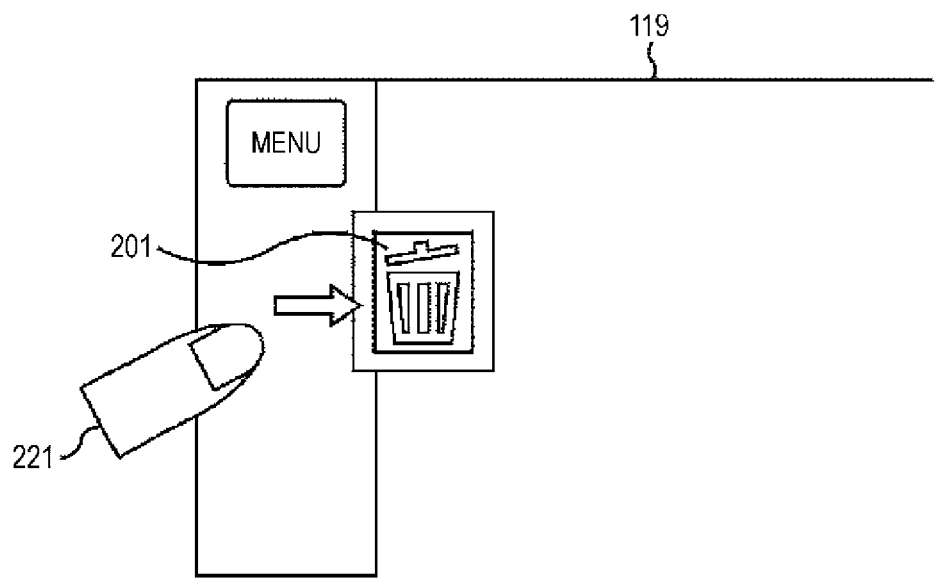
FIGS. 14A and 14B are diagrams illustrating still another example of the transition in the display screen of the touchscreen in a case where the icon is selected.

FIG. 14A illustrates another example of an image obtained when the touchscreen 119 is observed with the user's eyes. As shown in FIG. 14A, a user further approaches to a portion, on which the icon 201 is displayed, of the touchscreen 119 by using a finger 221. At this time, for example, it is assumed that the distance between the finger 221 and the touchscreen 119 is less than the threshold value Th1 and is equal to or larger than a threshold value Th2.

Figure 14B:
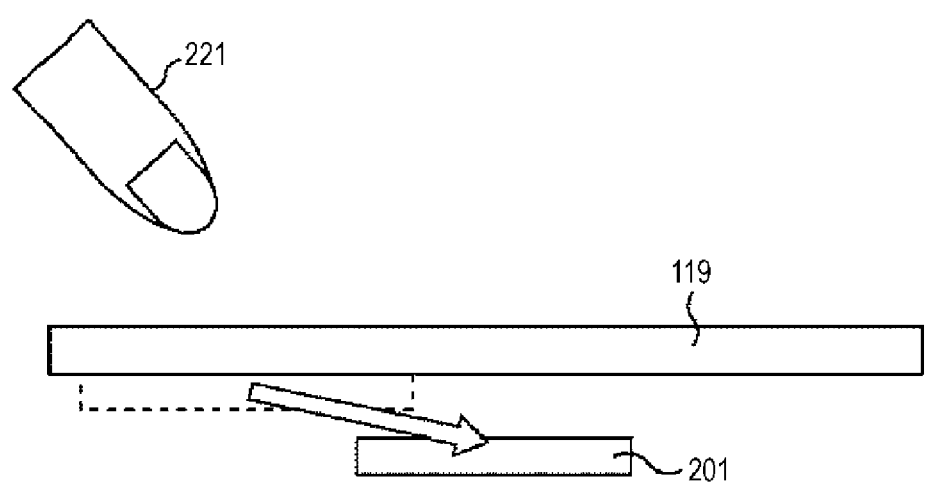

FIG. 14B shows a diagram that is obtained when the touchscreen 119 is seen from the downward direction of FIG. 14A, and that illustrates a virtual sense of the distance between the icon 201 of the touchscreen 119 and the finger 221, which the user perceives as a result of observing the touchscreen 119. In addition, FIG. 14B illustrates a sense of perspective which the user perceives from a 3D image, and actually, the icon 201 is just an image that is displayed on the surface of the touchscreen 119.

As shown in FIG. 14B, the icon 201 is drawn toward the inside of the touchscreen 119 in the depth direction thereof, and is apart from the finger 221. That is, the distance between the finger 221 and the touchscreen 119 is less than the threshold value Th1, such that an image having parallax is generated, and the icon 201 seen from a user looks as if it is drawn toward the inside of the touchscreen 119.

In addition, in the case of FIG. 14B, the icon 201 moves toward in a right-lower side differently from the case of FIG. 10B.

Figure 15A:
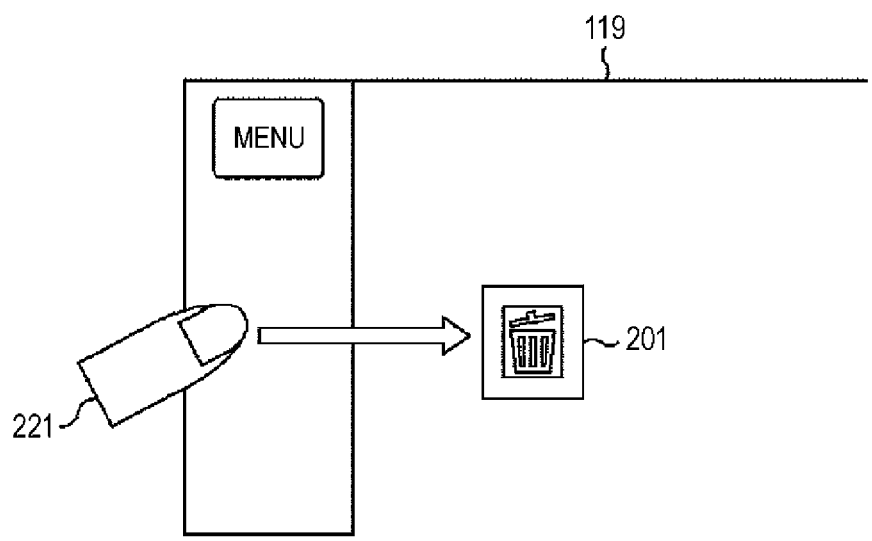
FIGS. 15A and 15B are diagrams illustrating still another example of the transition in the display screen of the touchscreen in a case where the icon is selected.

FIG. 15A illustrates still another example of an image obtained when the touchscreen 119 is observed with the user's eyes. As shown in FIG. 15A, a user further approaches to a portion, on which the icon 201 is displayed, of the touchscreen 119 by using a finger 221. At this time, for example, it is assumed that the distance between the finger 221 and the touchscreen 119 is less than the threshold value Th2.

Figure 15B:
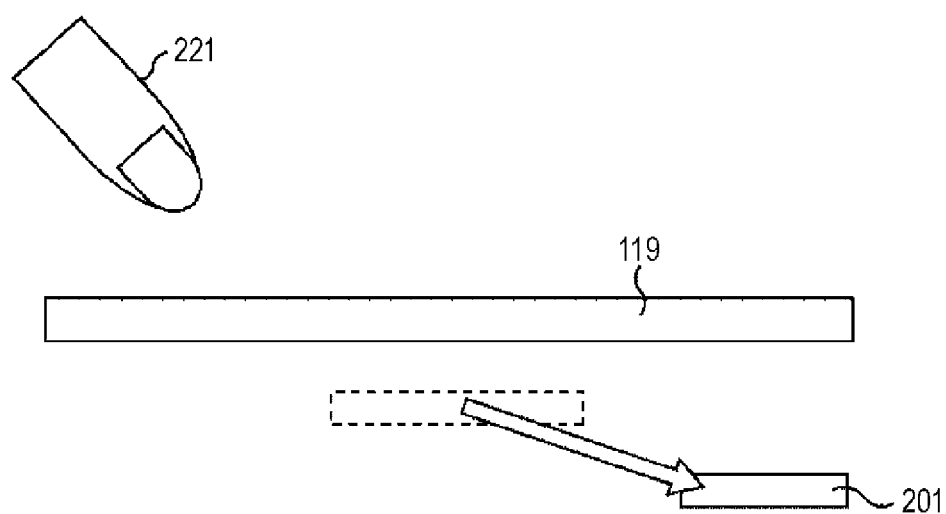

FIG. 15B shows a diagram that is obtained when the touchscreen 119 is seen from the downward direction of FIG. 15A, and that illustrates a virtual sense of the distance between the icon 201 of the touchscreen 119 and the finger 221, which the user perceives as a result of observing the touchscreen 119. In addition, FIG. 15B illustrates a sense of perspective which the user perceives from a 3D image, and actually, the icon 201 is just an image that is displayed on the surface of the touchscreen 119.

As shown in FIG. 15B, the icon 201 is further drawn toward the inside of the touchscreen 119. That is, the distance between the finger 221 and the touchscreen 119 is less than the threshold value Th2, such that an image having a still larger parallax is generated, and the icon 201 seen from a user looks as if it is further drawn to the inside of the touchscreen 119.

In addition, in the case of FIG. 15B, the icon 201 further moves toward a right-lower side differently from the case of FIG. 11B.

When 3D display is performed as described above with reference to FIGS. 13A to 15B, it looks as if the icon 201 escapes from the user's finger 221. In this manner, it is possible to more reliably allow the user to clearly come to feel that the icon 201 is an icon that is not selectable.

In addition, in FIGS. 14B and 15B, an example in which when the finger 221 approaches, the icon 201 moves (appears to move) to the right at the lower side in the drawing, but the icon 201 moves (appears to move) in the left direction at the lower side. That is, the icon 201 may move in a direction different from a direction (for example, the vertically downward direction in FIGS. 14B and 15B) in which the finger 221 approaches to the touchscreen 119.

In addition, in a case where the user tries to again select the icon 201 that escapes from the user, a 3D display in which the icon 201 looks as if it further escapes from the user may be performed.

FIGS. 16A to 19B show diagrams illustrating still another example of the transition of the display screen of the touchscreen 119 when the icon 201 is selected by the user.

FIG. 16A shows a diagram illustrating an example of an image obtained when the touchscreen 119 is observed with the user's eyes. As shown in FIG. 16A, the user approaches to a portion, on which the icon 201 is displayed, of the touchscreen 119 by using a finger 221. At this time, it is assumed that the finger 221 does not sufficiently approach to the touchscreen 119. For example, it is assumed that the distance between the finger 221 and the touchscreen 119 is equal to or larger than a threshold value Th1.

FIG. 16B shows a diagram that is obtained when the user views the touchscreen 119 from the downward direction of FIG. 16A, and that illustrates a virtual sense of the distance between the icon 201 of the touchscreen 119 and the finger 221, which the user perceives as a result of observing the touchscreen 119.

As shown in FIG. 16B, the icon 201 is not drawn toward the inside of the touchscreen 119. That is, the distance between the finger 221 and the touchscreen 119 is equal to or larger than a threshold value Th1, such that an image having parallax is not generated, and the icon 201 seen from a user appears to be located on the surface of the touchscreen 119. In addition, FIG. 16B illustrates a sense of perspective which the user perceives from a 3D image, and actually, the icon 201 is just an image that is displayed on the surface of the touchscreen 119.

Figure 17A:
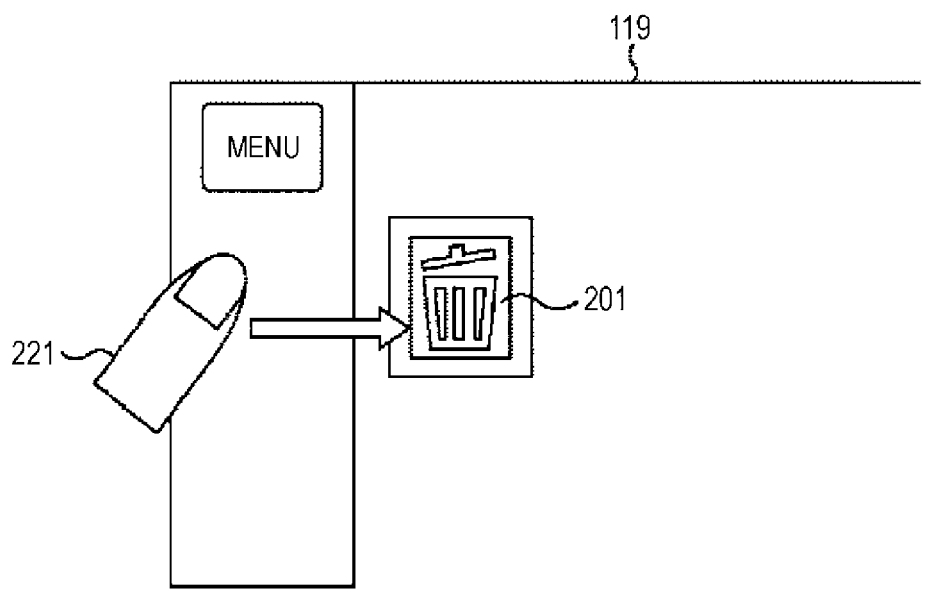
FIGS. 17A and 17B are diagrams illustrating still another example of the transition in the display screen of the touchscreen in a case where the icon is selected.

FIG. 17A illustrates another example of an image obtained when the touchscreen 119 is observed with the user's eyes. As shown in FIG. 17A, a user further approaches to a portion, on which the icon 201 is displayed, of the touchscreen 119 by using a finger 221. At this time, for example, it is assumed that the distance between the finger 221 and the touchscreen 119 is less than the threshold value Th1 and is equal to or larger than a threshold value Th2.

Figure 17B:
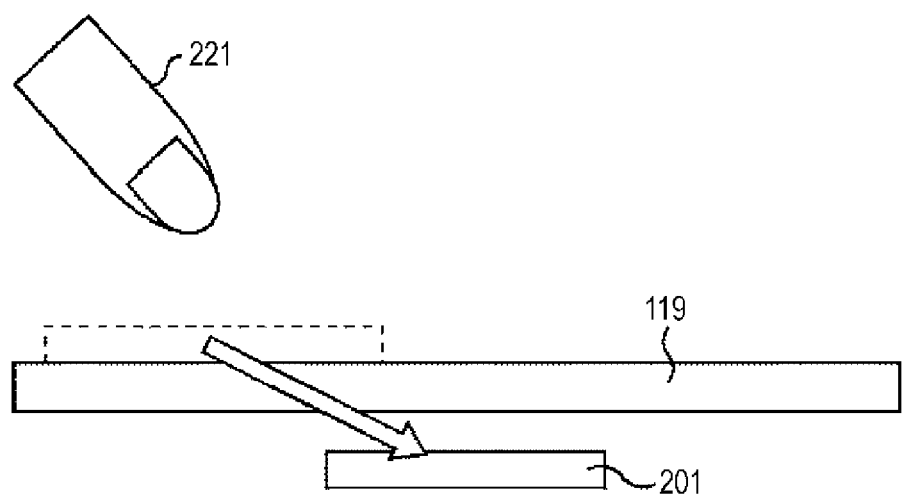

FIG. 17B shows a diagram that is obtained when the touchscreen 119 is seen from the downward direction of FIG. 17A, and that illustrates a virtual sense of the distance between the icon 201 of the touchscreen 119 and the finger 221, which the user perceives as a result of observing the touchscreen 119. In addition, FIG. 17B illustrates a sense of perspective which the user perceives from a 3D image, and actually, the icon 201 is just an image that is displayed on the surface of the touchscreen 119.

As shown in FIG. 17B, the icon 201 is drawn toward the inside of the touchscreen 119 in the depth direction thereof, and is apart from the finger 221. That is, the distance between the finger 221 and the touchscreen 119 is less than the threshold value Th1, such that an image having parallax is generated, and the icon 201 seen from a user looks as if it is drawn toward the inside of the touchscreen 119. In addition, the icon 201 moves to the right at the lower side in the drawing in the drawing. The configuration described until now is the same as that of the case described with reference to FIGS. 13A to 14B.

Figure 18A:
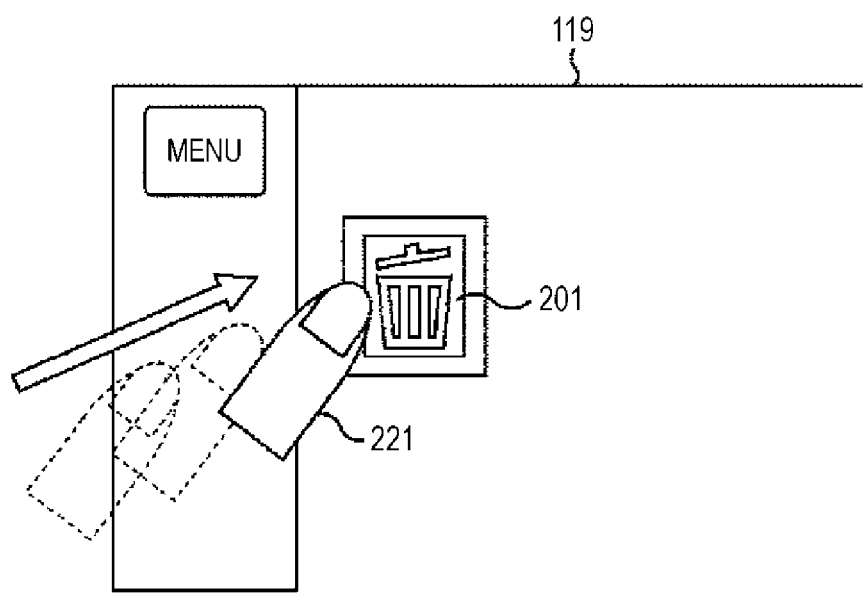
FIGS. 18A and 18B are diagrams illustrating still another example of the transition in the display screen of the touchscreen in a case where the icon is selected.

FIG. 18A illustrates still another example of an image obtained when the touchscreen 119 is observed with the user's eyes. As shown in FIG. 18A, the user's finger 221 moves in a right direction, accompanied with the movement of the icon 201 in the right direction in FIGS. 17A and 17B. That is, the user tries to again select the icon 201 that escapes from the user. In addition, in the same drawing, the finger is depicted by a dotted line, and this dotted line indicates the movement of the finger.

Figure 18B:
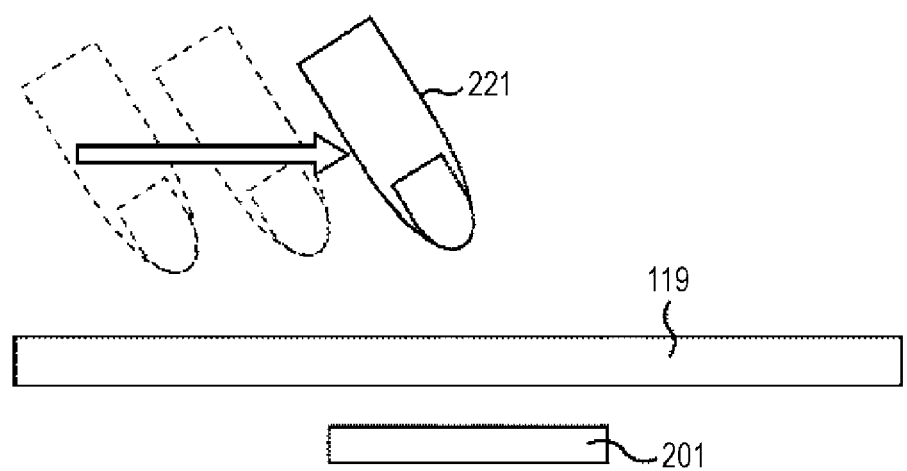

FIG. 18B shows a diagram that is obtained when the touchscreen 119 is seen from the downward direction of FIG. 18A, and that illustrates a virtual sense of the distance between the icon 201 of the touchscreen 119 and the finger 221, which the user perceives as a result of observing the touchscreen 119. In addition, FIG. 18B illustrates a sense of perspective which the user perceives from a 3D image, and actually, the icon 201 is just an image that is displayed on the surface of the touchscreen 119.

In FIG. 18B, the user moves the finger 221 in a right direction, such that the finger 221 is located in a vertically upper side of the icon 201 in the drawing.

Figure 19A:
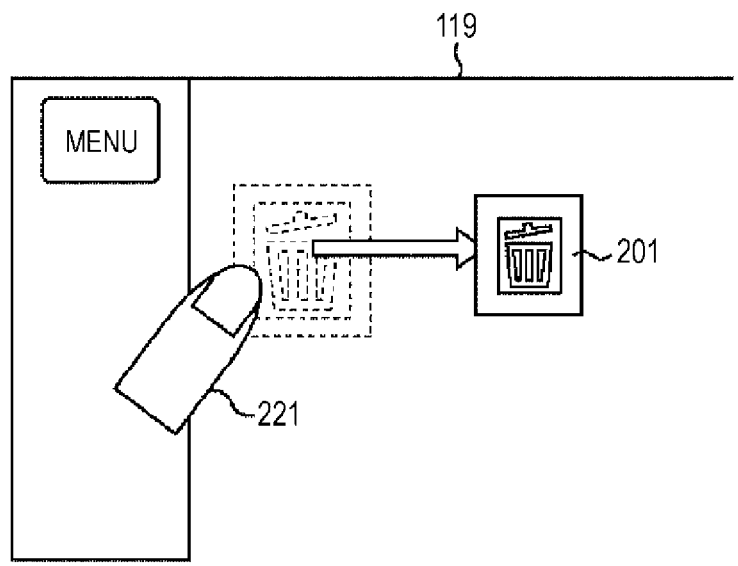
FIGS. 19A and 19B are diagrams illustrating still another example of the transition in the display screen of the touchscreen in a case where the icon is selected.

FIG. 19A illustrates still another example of an image obtained when the touchscreen 119 is observed with the user's eyes. As shown in FIG. 19A, a user further approaches to a portion, on which the icon 201 is displayed, of the touchscreen 119 by using a finger 221. At this time, for example, it is assumed that the distance between the finger 221 and the touchscreen 119 is less than the threshold value Th2.

Figure 19B:
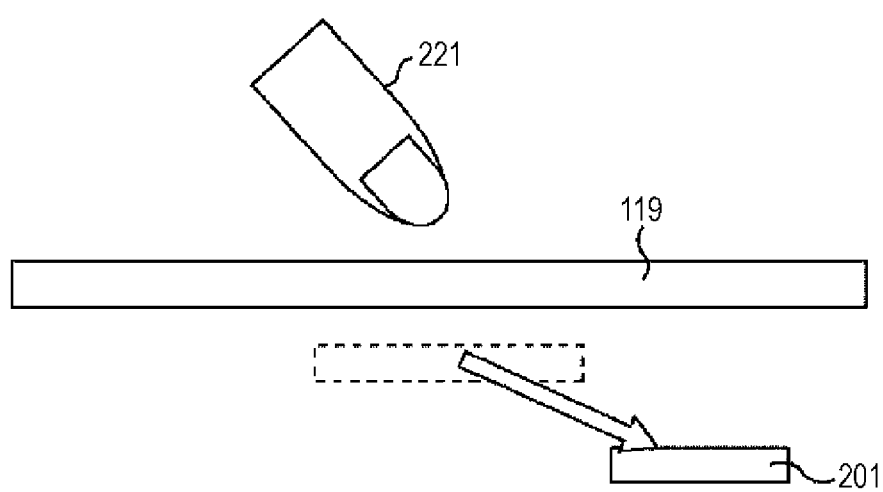

FIG. 19B shows a diagram that is obtained when the touchscreen 119 is seen from the downward direction of FIG. 19A, and that illustrates a virtual sense of the distance between the icon 201 of the touchscreen 119 and the finger 221, which the user perceives as a result of observing the touchscreen 119. In addition, FIG. 19B illustrates a sense of perspective which the user perceives from a 3D image, and actually, the icon 201 is just an image that is displayed on the surface of the touchscreen 119.

As shown in FIG. 19B, the icon 201 is further drawn toward the inside of the touchscreen 119. That is, the distance between the finger 221 and the touchscreen 119 is less than the threshold value Th2, such that an image having a still larger parallax is generated, and the icon 201 seen from a user looks as if it is further drawn to the inside of the touchscreen 119. In addition, as shown in FIG. 19B, the icon 201 further moves in the right direction at the lower side in the drawing.

In addition, in FIGS. 17B, 18B, and 19B, an example in which when the finger 221 approaches, the icon 201 moves (appears to move) to the right direction at the lower side in the drawing, but the icon 201 moves (appears to move) in the left direction at the lower side. That is, the icon 201 may move in a direction different from a direction (for example, the vertically downward direction in FIGS. 17B, 18B, and 19B in which the finger 221 approaches to the touchscreen 119.

As described above with reference to FIGS. 16A to 19B, when a 3D display is performed, it looks as if the icon 201 escapes from the user's finger 221. In addition, in a case where the user tries to again select the icon 201 that escapes from the user, it looks as if the icon 201 further escapes from the user. That is, even when the not selectable icon 201 is pursued by the finger 221, it looks as if the icon 201 escapes from the finger 221. In this manner, it is possible to more reliably allow the user to clearly come to feel that the icon 201 is an icon that is not selectable and it is possible to present an enjoyable image using a 3D display.

In addition, as shown in FIGS. 14A, 14B, 15A, 15B, 17A, 17B, 18A, 18B, 19A and 19B, when the icon 201 is drawn toward the inside of the touchscreen 119, a color of the icon 201 may be changed. In this manner, it is possible to more reliably allow the user to clearly come to feel that the icon 201 is an icon that is not selectable.

In addition, when the icon 201 is drawn toward the inside of the touchscreen 119, a shape of the icon 201 may be changed. For example, the icon 201 may be displayed with the shape thereof changed such that the icon 201 looks as if it is twisted. In this manner, it is possible to present a more engaging image.

Hereinbefore, an example where the present technology is applied to the imaging apparatus 50 is described, but the present technology may be applied to other electronic apparatuses other than the imaging apparatus. The present technology may be applied an arbitrary apparatus as long as an operation using a touchscreen or the like is performed.

In addition, hereinbefore, an example where the icon or the like displayed on the touchscreen is operated by using a finger or the like is described, but for example, the present technology may be applied to a case where the icon or the like displayed on the touchscreen is operated by using a stylus pen or the like.

In addition, hereinbefore, an example where the 3D display is performed when the icon in the menu screen displayed on the touchscreen is selected is described, but the application of the present technology is not limited thereto. The point is that the present technology may be applied as long as a GUI part is displayed on the touchscreen or the like, and this GUI part is operated.

For example, when a thumbnail image or the like that is displayed on the touchscreen is selected, this may be displayed three-dimensionally. For example, in a case where the present technology is applied, it is possible to display the thumbnail image with an arbitrary color as it is, such that a more beautiful image may be displayed, compared to a case where the thumbnail image or the like is displayed grayed-out in the related art.

In addition, hereinbefore, an example where the 3D display is performed by the touchscreen having the 3D display in which the parallax barrier system is adopted is described, but the present disclosure may be applied even in a case where the 3D display is performed using a system other than the parallax barrier system. For example, a touchscreen having a 3D display in which a lenticular system is adopted may be used.

In addition, a touchscreen having a 3D display that allows a user to observe it with wearing special eyeglasses other than the 3D display that allows the user to observe it with the naked eye may be used.

In addition, the above-described series of processes may be executed by hardware or software. In a case where the above-described series of processes is executed by the software, a program making up the software may be installed, over a network or from a recording medium, on a computer in which dedicated hardware is assembled, or for example, a general purpose personal computer 700 shown in FIG. 20, which can execute various functions by installing various programs.

In FIG. 20, a CPU (Central Processing Unit) 701 performs various processes according to a program that is stored in a ROM (Read Only Memory) 702, or a program that is loaded into a RAM (Random Access Memory) 703 from a storage unit 708. In the RAM 703, data necessary for executing various processes by the CPU 701 is appropriately stored.

The CPU 701, the ROM 702, and the RAM 703 are connected to each other through a bus 704. In addition, an I/O interface 705 is connected to the bus 704.

To the I/O interface 705, an input unit 706 such as a keyboard and a mouse, a display such as an LCD (Liquid Crystal Display), an output unit 707 such as a speaker, a storage unit 708 such as a hard disk, and a communication unit 709 such as a modem and a network interface card including a LAN card or the like are connected. The communication unit 709 performed a communication process over a network including the Internet.

A drive 710 is connected to the I/O interface 705 as necessary, and a removable medium 711 such as a magnetic disk, an optical disc, a magneto-optical disc, and a semiconductor memory is appropriately mounted, and therefore a computer program read out from these may be installed in the storage unit 708 as necessary.

In the case of executing the above-described series of processes by software, a program making up the software may be installed over a network such as the Internet, or recording medium such as the removable medium 711.

In addition, separately from a main body of the apparatus shown in FIG. 20, this recording medium may be composed of not only the removable medium 711 including a magnetic disk (including a floppy disk (registered trademark)), an optical disc (including CD-ROM (Compact Disc-Read Only Memory), and a DVD (Digital Versatile Disc)), a magneto-optical disc (including MD (Mini-Disc)(registered trade mark)), a semiconductor memory, or the like, which is distributed for transmitting a program to a user and on which the program is recorded, but also the ROM 702, a hard disk included in the storage unit 708, or the like, which is distributed to a user in a state of being assembled in advance to the main body of the apparatus and in which the program is recorded.

It should be noted that the present disclosure can also take the following configurations.

(1)

An image processing apparatus, including:

an approach detecting unit that detects whether or not an object, which operates a GUI part, approaches with respect to a display unit that displays the GUI part;

a part specifying unit that specifies the GUI part that is operated, in a case where the object approaches;

an operation possibility determining unit that determines whether or not the operation of the specified GUI part is possible; and an image data generating unit that generates image data that controls a depth display of the display unit in order for the GUI part to go away from the object, based on a result of the determination on the operation possibility of the GUI part.

(2)

The image processing unit according to (1), wherein the image data generating unit generates image data, which controls the depth display of the display unit, according to a degree to which the object approaches with respect to the display unit.

(3)

The image processing apparatus according to (2), wherein the degree of approach is compared to a threshold value set in advance, and parallax, which is used for the control of the depth display of the display unit, is set in correspondence with the comparison result.

(4)

The image processing apparatus according to (1), wherein the image data generating unit generates the image data such that a color of the image of the specified GUI part is changed.

(5)

The image processing apparatus according to (1), wherein the image data generating unit generates the image data such that a shape of the image of the specified GUI part is changed.

(6)

The image processing apparatus according to (1), wherein image data which allows the GUI part to be displayed in such a manner that the GUI part moves in a direction different from a direction from which the object approaches and the GUI part goes away from the object is generated.

(7)

The image processing apparatus according to (1), wherein the display unit includes a 3D display that adopts a parallax barrier system.

(8)

The image processing apparatus according to (1), wherein the approach detection unit includes a touchscreen.

(9)

An image processing method, including:

allowing an approach detecting unit to detect whether or not an object, which operates a GUI part, approaches with respect to a display unit that displays the GUI part;

allowing a part specifying unit to specify the GUI part that is operated, in a case where the object approaches;

allowing an operation possibility determining unit to determine whether or not the operation of the specified GUI part is possible; and allowing an image data generating unit to generate image data that controls a depth display of the display unit in order for the GUI part to go away from the object, based on a result of the determination on the operation possibility of the GUI part.

(10)

A program that allows a computer to function as an image processing apparatus, wherein the image processing apparatus includes, an approach detecting unit that detects whether or not an object, which operates a GUI part, approaches with respect to a display unit that displays the GUI part;

a part specifying unit that specifies the GUI part that is operated, in a case where the object approaches;

an operation possibility determining unit that determines whether or not the operation of the specified GUI part is possible; and an image data generating unit that generates image data that controls a depth display of the display unit in order for the GUI part to go away from the object, based on the result of the determination on the operation possibility of the GUI part.

In addition, the above-described series of processes in the present specification includes not only processes performed in time series according to the described sequence, but also processes performed in parallel or separately even though not necessarily performed in time series.

In addition, an embodiment of the present disclosure is not limited to the above-described embodiments, and various changes may be made without departing from the scope of the present disclosure.

REFERENCE SIGNS LIST

50: Imaging apparatus
119: Touch screen
120: Liquid crystal panel
121: Approach panel
134: Digital signal processing unit
136: CPU
137: Operation unit
138: EEPROM
139: Program ROM
140: RAM
181: Approach determining unit
182: Selection possibility determining unit
183: Parallax adjusting unit
184: 3D image generating unit
201: Icon

The invention claimed is:

1. A control unit comprising:
a control circuit that controls a depth of display of a part of a graphical user interface displayed on a display, said control circuit deepens the depth of display of the part when an object is detected as approaching the display so that the part is visually drawn toward the inside of the display,
wherein when the object is detected as approaching the part, the part is moved on the display in a direction in which the object approaches the part displayed on the display.

2. The control unit of claim 1, wherein the control unit deepens the depth of display by increasing a parallax of the part on the display, wherein the parallax is a distance between a position of the part in a left eye image and a position of the part in a right eye image.

3. The control unit of claim 1, further comprising:
a sensor that detects the object when the object is at a predetermined distance from the display.

4. The control unit of claim 1, wherein the display is a 3-dimensional display.

5. The control unit of claim 4, wherein said 3-dimensional display presents a left image and a right image.

6. The control unit of claim 1, wherein the part is an icon displayed on the display.

7. The control unit of claim 6, wherein when the object is detected as approaching the icon, the icon is moved on the display in a direction other than a depth direction.

8. The control unit of claim 6, wherein when the control circuit moves the icon toward an inner portion of the display, the control circuit changes a color of the icon.

9. The control unit of claim 6, wherein when the control circuit moves the icon toward an inner portion of the display, the control circuit changes a shape of the icon.

10. The control unit of claim 6, wherein the icon is a user-selectable icon and the control circuit deepens the depth of display when the object is detected as being within a predetermined distance from the icon.

11. The control unit of claim 6, wherein the control circuit changes the icon from a first state to a second state that is perceived visually different than the first state.

12. An image control method comprising:
displaying a graphical user interface on a display;
detecting an object approaching the display; and
controlling with a control circuit a depth of display of a part of the graphical user interface, said controlling includes deepening the depth of display of the part when the object is detected as approaching the display so that the part is visually drawn toward the inside of display,
wherein when the object is detected as approaching the part, the part is moved on the display in a direction in which the object approaches the part displayed on the display.

13. The method of claim 12, wherein the controlling includes deepening the depth of display by increasing a parallax of the part on the display, wherein the parallax is a distance between a position of the part in a left eye image and a position of the part in a right eye image.

14. The method of claim 12, wherein the part is an icon displayed on the display.

15. The method of claim 14, wherein the icon is a user-selectable icon and the control circuit deepens the depth of display when the object is detected as being within a predetermined distance from the icon.

16. A non-transitory computer-readable storage medium having instructions stored therein that when executed by a processing circuit cause the processing circuit to execute a method, the method comprising:
displaying a graphical user interface on a display;
detecting an object approaching the display; and
controlling with a control circuit a depth of display of a part of the graphical user interface, said controlling includes deepening the depth of display of the part when the object is detected as approaching the display so that the part is visually drawn toward the inside of the display,
wherein when the object is detected as approaching the part, the part is moved on the display in a direction in which the object approaches the part displayed on the display.

17. The non-transitory computer-readable storage medium of claim 16, wherein the controlling includes deepening the depth of display by increasing a parallax of the part on the display, wherein the parallax is a distance between a position of the part in a left eye image and a position of the part in a right eye image.

18. The non-transitory computer-readable storage medium of claim 16, wherein the part is an icon displayed on the display.

19. The non-transitory computer-readable storage medium of claim 18, wherein the icon is a user-selectable icon and the control circuit deepens the depth of display when the object is detected as being within a predetermined distance from the icon.

20. A control unit comprising:
 a control circuit that:
 controls a depth of display of a part of a graphical user interface displayed on a display, wherein said control circuit deepens the depth of display of the part when an object is detected as approaching the display so that the part is visually drawn toward the inside of the display;
 sets a first parallax for the part in a state where a distance between the object and the display is lesser than a first threshold and is equal to or larger than a second threshold; and
 sets a second parallax, larger than the set first parallax, for the part in a state where the distance between the object and the display is lesser than the second threshold,
 wherein each of the first parallax and the second parallax is a distance between a position of the part in a left eye image and a position of the part in a right eye image.

\* \* \* \* \*